United States Patent
Luo et al.

(10) Patent No.: US 11,991,713 B2
(45) Date of Patent: May 21, 2024

(54) DATA SCHEDULING METHOD, APPARATUS, AND SYSTEM

(71) Applicant: HUAWEI TECHNOLOGIES CO., LTD., Guangdong (CN)

(72) Inventors: Zhihu Luo, Beijing (CN); Jun Li, Shanghai (CN); Zhe Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 358 days.

(21) Appl. No.: 17/388,527

(22) Filed: Jul. 29, 2021

(65) Prior Publication Data

US 2021/0360681 A1  Nov. 18, 2021

Related U.S. Application Data

(63) Continuation of application No. PCT/CN2019/109250, filed on Sep. 29, 2019.

(30) Foreign Application Priority Data

Feb. 3, 2019  (WO) ................ PCT/CN2019/074720
Apr. 30, 2019  (WO) ................ PCT/CN2019/085354

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1819* (2013.01); *H04L 1/1896* (2013.01); *H04W 72/0446* (2013.01); *H04W 72/1263* (2013.01)

(58) Field of Classification Search
CPC . H04W 72/23; H04W 72/21; H04W 72/0446; H04W 72/0453; H04W 72/20;
(Continued)

(56) References Cited

U.S. PATENT DOCUMENTS

2011/0051824 A1  3/2011  Kim et al.
2017/0288845 A1  10/2017  Axmon et al.
2019/0363857 A1  11/2019  Hwang et al.

FOREIGN PATENT DOCUMENTS

CN  106612557 A  5/2017
CN  107231218 A  10/2017
(Continued)

OTHER PUBLICATIONS

Ericsson, "Updated Feature lead summary Scheduling of multiple DL UL transport," 3GPP TSG-RAN WG1 Meeting #95, R1-1813759, Spokane, USA, Nov. 12-16, 2018, 14 pages.
(Continued)

*Primary Examiner* — Khalid W Shaheed
(74) *Attorney, Agent, or Firm* — Fish & Richardson P.C.

(57) ABSTRACT

The present disclosure relates to data scheduling methods, apparatus, and systems. In one example method, a network device sends, to a terminal device, downlink control information (DCI) used to schedule N transport blocks (TBs). After determining that a downlink channel that carries first M TBs in the N TBs is transmitted in consecutive first downlink time units, the network device sends the downlink channel to the terminal device. The terminal device receives the downlink channel. After determining that ACKs/NACKs corresponding to the M TBs are transmitted in consecutive first uplink time units, the terminal device sends the ACKs/NACKs corresponding to the M TBs to the network device. N is a positive integer greater than 1, and M is a positive integer greater than 1 and less than or equal to N.

20 Claims, 21 Drawing Sheets

(51) Int. Cl.
  *H04L 1/1867* (2023.01)
  *H04W 72/0446* (2023.01)
  *H04W 72/1263* (2023.01)

(58) Field of Classification Search
  CPC ............ H04W 72/04; H04W 74/0833; H04W 72/1268; H04W 24/02; H04W 52/0216; H04W 72/02; H04W 72/30
  See application file for complete search history.

(56) References Cited

FOREIGN PATENT DOCUMENTS

| | | |
|---|---|---|
| CN | 107332646 A | 11/2017 |
| CN | 108292974 A | 7/2018 |
| CN | 108365922 A | 8/2018 |
| CN | 108702759 A | 10/2018 |
| CN | 108809534 A | 11/2018 |
| CN | 108880768 A | 11/2018 |
| EP | 2919402 A1 | 9/2015 |
| JP | 2018526838 A | 9/2018 |
| WO | 2014182009 A1 | 11/2014 |
| WO | 2016204811 A1 | 12/2016 |
| WO | 2017170889 A1 | 10/2017 |
| WO | 2018010077 A1 | 1/2018 |
| WO | 2018084487 A1 | 5/2018 |
| WO | 2018145074 A1 | 8/2018 |

OTHER PUBLICATIONS

Extended European Search Report issued in European Application No. 19913327.3 on Mar. 3, 2022, 11 pages.
Office Action issued in Chinese Application No. 201980090038.3 on Sep. 5, 2022, 18 pages.
3GPP TS 36.212 V15.4.0 (Dec. 2018), "3rd Generation Partnership Project; Technical Specification Group Radio Access Network; Evolved Universal Terrestrial Radio Access (E-UTRA); Multiplexing and channel coding(Release 15)," Dec. 2018, 247 pages.
3GPP TS 36.213 V15.4.0 (Dec. 2018), "3rd Generation Partnership Project; Technical Specification Group Radio Access Network; Evolved Universal Terrestrial Radio Access (E-UTRA); Physical layer procedures(Release 15)," Dec. 2018, 551 pages.
Ericsson, "NB-IoT—Remaining issues for NPDSCH design," 3GPP TSG RAN WG1 Meeting #84bis, R1-162774, Busan, Korea, Apr. 11-15, 2016, 6 pages.
Ericsson, "Scheduling of multiple DL/UL transport blocks in LTE-MTC," 3GPP TSG-RAN WG1 Meeting #94bis, Tdoc R1-1810187, Chengdu, P.R. China, Oct. 8-12, 2018, 6 pages.
Huawei, HiSilicon, "Scheduling of multiple transport blocks," 3GPP TSG RAN WG1 Meeting #94bis, R1-1810090, Chengdu, China, Oct. 8-12, 2018, 7 pages.
PCT International Search Report and Written Opinion issued in International Application No. PCT/CN2019/074720 on Nov. 6, 2019, 15 pages (with English translation).
PCT International Search Report and Written Opinion issued in International Application No. PCT/CN2019/085354 on Nov. 4, 2019, 16 pages (with English translation).
PCT International Search Report and Written Opinion issued in International Application No. PCT/CN2019/109250 on Dec. 27, 2019, 14 pages (with English translation).
WI rapporteur (Ericsson), "RAN1 agreements for Rel-15 Further NB-IoT enhancements," 3GPP TSG-RAN WG1 Meeting #92bis, R1-1805437, Sanya, China, Apr. 16-20, 2018, 23 pages.
Intel Corporation, "Remaining Details of NB-PUSCH," 3GPP TSG RAN WG1 Meeting #84bis, R1-162978, Busan, South Korea, Apr. 11-15, 2016, 6 pages.
Lenovo, Motorola Mobility, "Views on TDD Common Aspect," 3GPP TSG RAN WG1 Meeting #93, R1-1806349, Busan, South Korea, May 21-25, 2018, 3 pages.
NTT DOCOMO, Inc., "Discussion on ack-NACK-NumRepetitions Configuration," 3GPP TSG-RAN WG2 Meeting #104, R2-1818384, Spokane, USA, Nov. 12-16, 2018, 2 pages.
Office Action issued in Japanese Application No. 2021-544807 on Sep. 27, 2022, 19 pages (with English translation).
Samsung, "Scheduling of Multiple Transport Blocks for MTC," 3GPP TSG RAN WG1 Meeting #95, R1-1812941, Spokane, USA, Nov. 12-16, 2018, 7 pages.

DATA SCHEDULING METHOD, APPARATUS, AND SYSTEM

CROSS-REFERENCE TO RELATED APPLICATIONS

This application is a continuation of International Application No. PCT/CN2019/109250, filed on Sep. 29, 2019, which claims priority to International Application No. PCT/CN2019/074720, filed on Feb. 3, 2019 and International Application No. PCT/CN2019/085354, filed on Apr. 30, 2019. All of the aforementioned patent applications are hereby incorporated by reference in their entireties.

TECHNICAL FIELD

This application relates to the communication field, and in particular, to a data scheduling method, an apparatus, and a system.

BACKGROUND

In the release (Rel) 14 of a narrowband internet of things (NB-IoT) system, a communication technology, with two hybrid automatic repeat request (HARQ) (hereinafter referred to as two HARQ) processes, is introduced. In one HARQ process, one corresponding transport block (transport block, TB) is scheduled, and one piece of downlink control information (DCI) is used to schedule one TB.

As shown in FIG. 1a, in NB-IoT downlink two HARQ scheduling of the Rel 14, a terminal device determines, based on an end moment of transmission of DCI1 #1 and a scheduling delay 1, a start moment of transmission of a narrowband physical downlink channel (NPDSCH) 1 #1 carrying a TB1 #1, and the terminal device determines, based on an end moment of DCI2 #2 and a scheduling delay 2, a start moment of transmission of a NPDSCH2 #2 carrying a TB2 #2. The scheduling delay 1 and the scheduling delay 2 each include a fixed delay of 4 ms and a dynamic indication delay. The dynamic indication delay is some fixed values indicated by using a scheduling delay field ($I_{Delay}$) in DCI. In addition, the terminal device determines a start moment of transmission of an acknowledgement/negative acknowledgement (ACK/NACK) 1 #1 based on an end moment of the transmission of the NPDSCH1 #1 and a HARQ delay 1. The terminal device determines a start moment of transmission of an ACK/NACK2 #2 based on an end moment of the transmission of the NPDSCH2 #2 and a HARQ delay 2. The HARQ delay 1 is some fixed values indicated by using an ACK/NACK resource field in DCI1, and the HARQ delay 2 is some fixed values indicated by using an ACK/NACK resource field in DCI2. In FIG. 1a and subsequent drawings, a suffix "#1" indicates a HARQ process 1, and "#2" indicates a HARQ process 2. In FIG. 1a and subsequent drawings, numbers following DCI, TBs, NPDSCHs, ACKs/NACKs, or NPUSCHs are used to distinguish different DCI, TBs, NPDSCHs, ACKs/NACKs, or NPUSCHs. For example, TB2 #2 indicates that the second TB scheduled by DCI is corresponding to the HARQ process 2. General descriptions are provided herein.

As shown in FIG. 1b, in NB-IoT uplink two HARQ scheduling of the Rel 14, a terminal device determines, based on an end moment of DCI1 #1 and a scheduling delay 1, a start moment of transmission of a narrowband physical uplink shared channel (NPUSCH) 1 #1 carrying a TB1 #1, and the terminal device determines, based on an end moment of DCI2 #2 and a scheduling delay 2, a start moment of transmission of a NPUSCH2 #2 carrying a TB2 #2. The scheduling delay 1 and the scheduling delay 2 each are some fixed values indicated by using a scheduling delay field in DCI.

In the Rel 16 of the NB-IoT system, to reduce DCI overheads, scheduling of a plurality of TBs by one piece of DCI is supported. For downlink, as shown in FIG. 1c, if a scheduling delay mechanism in the NB-IoT downlink two HARQ scheduling of the Rel 14 is still used, because values of the scheduling delay 1, the scheduling delay 2, the HARQ delay 1, and the HARQ delay 2 are all fixed values, transmission duration of the NPDSCH1 #1 may be limited by the scheduling delay 1 and the scheduling delay 2. That is, maximum transmission duration of the NPDSCH1 #1 is only equal to a difference between the scheduling delay 2 and the scheduling delay 1. Transmission duration of the ACK/NACK1 #1 may be limited by the HARQ delay 1 and the HARQ delay 2. That is, maximum transmission duration of the ACK/NACK1 #1 is only equal to a difference between the HARQ delay 2 and the HARQ delay 1. In addition, values of the scheduling delay 2 and the HARQ delay 2 are usually relatively small. Therefore, resource allocation of the NPDSCH1 #1 and the ACK/NACK1 #1 in the two HARQ scheduling is greatly limited. Similarly, for uplink, as shown in FIG. 1d, if a scheduling delay mechanism in the NB-IoT uplink two HARQ scheduling of the Rel 14 is still used, because values of the scheduling delay 1 and the scheduling delay 2 are fixed values, transmission duration of the NPUSCH1 #1 may be limited by the scheduling delay 1 and the scheduling delay 2, and resource allocation of the NPUSCH1 #1 in the two HARQ scheduling is also greatly limited.

In conclusion, when one piece of DCI schedules a plurality of TBs, how to improve resource allocation flexibility is a problem that needs to be urgently resolved at present.

SUMMARY

Embodiments of this application provide a data scheduling method, an apparatus, and a system, to improve resource allocation flexibility when one piece of DCI schedules a plurality of TBs.

To achieve the foregoing objective, the following technical solutions are used in the embodiments of this application.

According to a first aspect, a data scheduling method and a corresponding communication apparatus are provided. In this solution, a terminal device receives downlink control information DCI from a network device, where the DCI schedules N transport blocks TBs. The terminal device determines that a downlink channel carrying M TBs is transmitted in consecutive first downlink time units, where the M TBs are first M TBs in the N TBs, a start time of the first downlink time units is determined based on an end time of transmission of the DCI and a first delay, N is a positive integer greater than 1, and M is a positive integer greater than 1 and less than or equal to N. The terminal device receives the downlink channel carrying the M TBs from the network device in the first downlink time units. The terminal device determines that acknowledgements ACKs or negative acknowledgements NACKs corresponding to the M TBs are transmitted in consecutive first uplink time units, where a start time of the first uplink time units is determined based on an end time of the first downlink time units and a second delay. The terminal device sends the ACKs or NACKs corresponding to the M TBs to the network device in the first uplink time units. When one piece of DCI schedules a plurality of TBs, in this embodiment of this application, the downlink channel carrying the M TBs is transmitted in the consecutive first downlink time units, and the start time of the first downlink time units is determined based on the end time of transmission of the DCI and the first delay. Therefore, resource allocation of the M TBs is not limited. In addition, in this embodiment of this application, the ACKs or NACKs corresponding to the M TBs are transmitted in the consecutive first uplink time units, and the start time of the first uplink time units is determined based on the end time of the first downlink time units and the second delay. Therefore, resource allocation of the ACKs or NACKs corresponding to the M TBs is not limited either. In conclusion, based on the solution provided in this embodiment of this application, resource allocation flexibility can be improved when one piece of DCI schedules a plurality of TBs.

It should be noted that, in this embodiment of this application, the ACKs or NACKs corresponding to the M TBs may be understood as an acknowledgement ACK or negative acknowledgement NACK corresponding to each TB in the M TBs. For example, if M=2, one TB may be corresponding to an ACK, and the other TB may be corresponding to an ACK; one TB may be corresponding to an ACK, and the other TB may be corresponding to a NACK; one TB may be corresponding to a NACK, and the other TB may be corresponding to an ACK; or one TB may be corresponding to a NACK, and the other TB may be corresponding to a NACK. General descriptions are provided herein, and details are not described below.

In a possible design, if N=M+S, and S is a positive integer, after the terminal device sends the ACKs or NACKs corresponding to the M TBs to the network device in the first uplink time units, the method further includes: The terminal device determines that a downlink channel carrying S TBs is transmitted in consecutive second downlink time units, where the S TBs are last S TBs in the N TBs, and a start time of the second downlink time units is determined based on an end time of the first uplink time units and predefined duration. The terminal device receives the downlink channel carrying the S TBs from the network device in the second downlink time units. The terminal device determines that ACKs or NACKs corresponding to the S TBs are transmitted in consecutive second uplink time units, where a start time of the second uplink time units is determined based on an end time of the second downlink time units and a third delay, where if S=1, the third delay is greater than or equal to the second delay; or if S is greater than 1, the third delay is equal to the second delay. The terminal device sends the ACKs or NACKs corresponding to the S TBs to the network device in the second uplink time units. Based on this solution, when one piece of DCI schedules a plurality of TBs, resource allocation flexibility can be improved, and discontinuous transmission of the TBs can be implemented.

According to a second aspect, a data scheduling method and a corresponding communication apparatus are provided. In this solution, a network device sends downlink control information DCI to a terminal device, where the DCI schedules N transport blocks TBs. The network device determines that a downlink channel carrying M TBs is transmitted in consecutive first downlink time units, where the M TBs are first M TBs in the N TBs, a start time of the first downlink time units is determined based on an end time of transmission of the DCI and a first delay, N is a positive integer greater than 1, and M is a positive integer greater than 1 and less than or equal to N. The network device sends the downlink channel carrying the M TBs to the terminal device in the first downlink time units. The network device determines that acknowledgements ACKs or negative acknowledgements NACKs corresponding to the M TBs are transmitted in consecutive first uplink time units, where a start time of the first uplink time units is determined based on an end time of the first downlink time units and a second delay. The network device receives the ACKs or NACKs corresponding to the M TBs from the terminal device in the first uplink time units. For a technical effect brought by the second aspect, refer to the technical effect brought by the first aspect. Details are not described herein again.

In a possible design, if N=M+S, and S is a positive integer, after the network device sends the downlink channel carrying the M TBs to the terminal device in the first downlink time units, the method further includes:

The network device determines that a downlink channel carrying S TBs is transmitted in consecutive second downlink time units, where the S TBs are last S TBs in the N TBs, and a start time of the second downlink time units is determined based on an end time of the first uplink time units and predefined duration. The network device sends the downlink channel carrying the S TBs to the terminal device in the second downlink time units. The network device determines that ACKs or NACKs corresponding to the S TBs are transmitted in consecutive second uplink time units, where a start time of the second uplink time units is determined based on an end time of the second downlink time units and a third delay, where if S=1, the third delay is greater than or equal to the second delay; or if S is greater than 1, the third delay is equal to the second delay. The network device receives the ACKs or NACKs corresponding to the S TBs from the terminal device in the second uplink time units. Based on this solution, when one piece of DCI schedules a plurality of TBs, resource allocation flexibility can be improved, and discontinuous transmission of the TBs can be implemented.

With reference to the first aspect or the second aspect, in a possible design, if S=1, the third delay is max{a, the second delay}, and a is a specified value.

With reference to the first aspect or the second aspect, in a possible design, the consecutive second downlink time units are N3 consecutive valid downlink subframes, where N3 is determined based on S, $N_{Rep}$, and $N_{SF}$, $N_{Rep}$ is determined based on a repetition number field in the DCI, and $N_{SF}$ is determined based on a resource assignment field in the DCI.

With reference to the first aspect or the second aspect, in a possible design, N3, S, $N_{Rep}$, and $N_{SF}$ satisfy: $N3 = SN_{Rep}N_{SF}$.

With reference to the first aspect or the second aspect, in a possible design, the consecutive second uplink time units are N4 consecutive uplink slots, where N4 is determined based on S, $N_{Rep}^{AN}$, and $N_{slots}^{UL}$, $N_{Rep}^{AN}$ is a number of repetitions of an ACK or NACK corresponding to each TB, and $N_{slots}^{UL}$ is a number of consecutive uplink slots corresponding to one resource unit.

With reference to the first aspect or the second aspect, in a possible design, N4, S, $N_{Rep}^{AN}$, and $N_{slots}^{UL}$ satisfy: $N4 = SN_{Rep}^{AN}N_{slots}^{UL}$.

With reference to the first aspect or the second aspect, in a possible design, the DCI includes first indication information, second indication information, and third indication information, the first indication information is used to indicate a number N of TBs scheduled by the DCI, the second indication information is used to determine the first delay, and the third indication information is used to determine the second delay. Based on this solution, the terminal device may learn of the number N of TBs scheduled by the DCI, and the terminal device may determine the first delay and the second delay.

With reference to the first aspect or the second aspect, in a possible design, the consecutive first downlink time units are N1 consecutive valid downlink subframes, where N1 is determined based on M, $N_{Rep}$, and $N_{SF}$, $N_{Rep}$ is determined based on a repetition number field in the DCI, and $N_{SF}$ is determined based on a resource assignment field in the DCI.

With reference to the first aspect or the second aspect, in a possible design, N1, M, $N_{Rep}$, and $N_{SF}$ satisfy: $N1 = MN_{Rep}N_{SF}$.

With reference to the first aspect or the second aspect, in a possible design, the consecutive first uplink time units are N2 consecutive uplink slots, where N2 is determined based on M, $N_{Rep}^{AN}$, and $N_{slots}^{UL}$, $N_{Rep}^{AN}$ is a number of repetitions of an ACK or NACK corresponding to each TB, and $N_{slots}^{UL}$ is a number of consecutive uplink slots corresponding to one resource unit.

With reference to the first aspect or the second aspect, in a possible design, N2, M, $N_{Rep}^{AN}$, and $N_{slots}^{UL}$ satisfy: $N2 = MN_{Rep}^{AN}N_{slots}^{UL}$.

With reference to the first aspect or the second aspect, in a possible design, the second delay is greater than or equal to 10 ms.

With reference to the first aspect or the second aspect, in a possible design, a subcarrier bandwidth used to transmit the ACKs or NACKs corresponding to the M TBs is 3.75 kHz, and the second delay is one delay in a set {10 ms, 18 ms}; the second delay is one delay in a set {10 ms, 20 ms}; or the second delay is one delay in a set {10 ms, 26 ms}.

With reference to the first aspect or the second aspect, in a possible design, a subcarrier bandwidth used to transmit the ACKs or NACKs corresponding to the M TBs is 15 kHz, and the second delay is one delay in a set {10 ms, 12 ms, 14 ms, 15 ms}; the second delay is one delay in a set {10 ms, 14 ms, 16 ms, 17 ms}; the second delay is one delay in a set {10 ms, 12 ms, 14 ms, 16 ms}; or the second delay is one delay in a set {10 ms, 14 ms, 18 ms, 22 ms}.

With reference to the first aspect or the second aspect, in a possible design, the second delay is greater than or equal to 11 ms.

With reference to the first aspect or the second aspect, in a possible design, a subcarrier bandwidth used to transmit the ACKs or NACKs corresponding to the M TBs is 3.75 kHz, and the second delay is one delay in a set {11 ms, 19 ms}; the second delay is one delay in a set {11 ms, 20 ms}; or the second delay is one delay in a set {11 ms, 27 ms}.

With reference to the first aspect or the second aspect, in a possible design, a subcarrier bandwidth used to transmit the ACKs or NACKs corresponding to the M TBs is 15 kHz, and the second delay is one delay in a set {11 ms, 13 ms, 15 ms, 16 ms}; the second delay is one delay in a set {11 ms, 14 ms, 16 ms, 17 ms}; the second delay is one delay in a set {11 ms, 13 ms, 15 ms, 17 ms}; or the second delay is one delay in a set {11 ms, 15 ms, 19 ms, 23 ms}.

With reference to the first aspect or the second aspect, in a possible design, the second delay is related to at least one item in a first parameter set, and the first parameter set includes at least one of $N_{Rep}$, $N_{SF}$, $N_{Rep}^{AN}$, $N_{slots}^{UL}$, $T_{slot}$, and the subcarrier bandwidth of the ACKs or NACKs corresponding to the TBs scheduled by the DCI, where $N_{Rep}$ is determined based on the repetition number field in the DCI, $N_{SF}$ is determined based on the resource assignment field in the DCI, $N_{Rep}^{AN}$ is the number of repetitions of an ACK or NACK corresponding to each TB, $N_{slots}^{UL}$ is the number of consecutive uplink slots corresponding to one resource unit, and $T_{slot}$ is duration of one uplink slot.

With reference to the first aspect or the second aspect, in a possible design, when the subcarrier bandwidth used to transmit the ACKs or NACKs corresponding to the M TBs is 3.75 kHz, if both a first condition and a second condition are satisfied, the second delay is one delay in {Z11 ms, Z12 ms}; or if a first condition is not satisfied, a second condition is not satisfied, or neither a first condition nor a second condition is satisfied, the second delay is one delay in {W11 ms, W12 ms}. When the subcarrier bandwidth used to transmit the ACKs or NACKs corresponding to the M TBs is 15 kHz, if both a third condition and a fourth condition are satisfied, the second delay is one delay in {Z21 ms, Z22 ms, Z23 ms, Z24 ms}; or if a third condition is not satisfied, a fourth condition is not satisfied, or neither a third condition nor a fourth condition is satisfied, the second delay is one delay in {W21 ms, W22 ms, W23 ms, W24 ms}. The first condition is that transmission duration of a last TB in the M TBs scheduled by the DCI, $N_{Rep}$ $N_{SF}$, $N_{SF}*\min\{N_{Rep}, 4\}$, $\min\{N_{Rep}, 4\}$, or $N_{Rep}$ is greater than or equal to P1. The second condition is that transmission duration of an ACK/NACK corresponding to the first TB in the M TBs scheduled by the DCI, $N_{Rep}^{AN}$, $1000*N_{Rep}^{AN} N_{slots}^{UL} T_{slot}$, $N_{Rep}^{AN} N_{slots}^{UL} T_{slot}$, or $N_{Rep}^{AN} N_{slots}^{UL}$ is greater than or equal to Q1. The third condition is that the transmission duration of the last TB in the M TBs scheduled by the DCI, $N_{Rep}$, $N_{SF}$, $N_{SF}*\min\{N_{Rep}, 4\}$, $\min\{N_{Rep}, 4\}$, or $N_{Rep}$ is greater than or equal to P2. The fourth condition is that the transmission duration of the ACK/NACK corresponding to the first TB in the M TBs scheduled by the DCI, $N_{Rep}^{AN}$, $1000*N_{Rep}^{AN} N_{slots}^{UL} T_{slot}$, $N_{Rep}^{AN} N_{slots}^{UL} T_{slot}$, or $N_{Rep}^{AN} N_{slots}^{UL}$ is greater than or equal to Q2. $N_{Rep}$ is determined based on the repetition number field in the DCI, $N_{SF}$ is determined based on the resource assignment field in the DCI, $N_{Rep}^{AN}$ is the number of repetitions of an ACK or NACK corresponding to each TB, $N_{slots}^{UL}$ is the number of consecutive uplink slots corresponding to one resource unit, and $T_{slot}$ is the duration of one uplink slot. For example, meanings of the foregoing symbols are as follows:

Both P1 and Q1 are specified values, and both P1 and Q1 are positive integers. For example, P1=1, 8, 12, or 16, and Q1=2, 8, or 12.

Both Z11 and Z12 are specified values, and both Z11 and Z12 are positive integers. For example, Z11=1, 2, 4, 10, or 11, and Z12 satisfies: Z12=Z11+8 or Z12=Z11+16. It should be noted that, that Z12 satisfies the foregoing formula should be understood that a value of Z12 satisfies the foregoing formula, and no calculation needs to be performed. Alternatively, Z12 is obtained through calculation by using the foregoing formula; or Z12 is implemented in another manner, and a final effect is the same as that of the foregoing formula.

Both W11 and W12 are specified values, and both W11 and W12 are positive integers. For example, W11=10, 11, or 12, and W12 satisfies: W12=W11+8 or W12=W11+16. It should be noted that, a value of W11 is greater than that of Z11. It should be noted that, that W12 satisfies the foregoing formula should be understood that a value of W12 satisfies the foregoing formula, and no calculation needs to be performed. Alternatively. W12 is obtained through calculation by using the foregoing formula; or W12 is implemented in another manner, and a final effect is the same as that of the foregoing formula.

Both P2 and Q2 are specified values, and both P2 and Q2 are positive integers. For example, P2=1, 8, 12, 16, and Q2=2, 8, or 12.

Z21, Z22, Z23, and Z24 are all specified values, and Z21, Z22, Z23, and Z24 are all positive integers. For example, Z21=1, 2, or 4; Z22 satisfies: Z22=Z21+2, Z22=Z21+4, Z22=Z21+5, Z22=Z21+6, Z22=Z21+8, or Z22=Z21+12; Z23 satisfies: Z23=Z21+2, Z23=Z21+4, Z23=Z21+5, Z23=Z21+6, Z23=Z21+8, or Z23=Z21+12; and Z24 satisfies: Z24=Z21+2, Z24=Z21+4, Z24=Z21+5, Z24=Z21+6, Z24=Z21+8, or Z24=Z21+12. It should be noted that Z24>Z23>Z22 is numerically satisfied. That Z22, Z23, and Z24 satisfy the foregoing formulas should be understood that values of Z22, Z23, and Z24 satisfy the foregoing formulas, and no calculation needs to be performed. Alternatively, Z22, Z23, and Z24 are obtained through calculation by using the foregoing formulas; or Z22, Z23, and Z24 are implemented in other manners, and final effects are the same as those of the foregoing formulas.

W21, W22, W23, and W24 are all specified values, and W21, W22, W23, and W24 are all positive integers. For example, W21=10, 11, or 12; W22 satisfies: W22=W21+2, W22=W21+4, W22=W21+5. W22=W21+6, W22=W21+8, or W22=W21+12; W23 satisfies: W23=W21+2, W23=W21+4, W23=W21+5, W23=W21+6, W23=W21+8, or W23=W21+12; and W24 satisfies: W24=W21+2, W24=W21+4, W24=W21+5, W24=W21+6, W24=W21+8, or W24=W21+12. It should be noted that W24>W23>W22 is numerically satisfied, and W21 is greater than Z21. That W22, W23, and W24 satisfy the foregoing formulas should be understood that values of W22, W23, and W24 satisfy the foregoing formulas, and no calculation needs to be performed. Alternatively, W22, W23, and W24 are obtained through calculation by using the foregoing formulas; or W22, W23, and W24 are implemented in other manners, and final effects are the same as those of the foregoing formulas.

With reference to the first aspect or the second aspect, in a possible design, when the subcarrier spacing used to transmit the M corresponding ACKs or NACKs is 3.75 kHz, the second delay is one delay in {(X+A1) ms, (X+A2) ms}; or when the subcarrier spacing used to transmit the M corresponding ACKs or NACKs is 15 kHz, the second delay is one delay in {(X+B1) ms, (X+B2) ms, (X+B3) ms, (X+B4) ms}. X is between T1 and T2 and is a minimum value in a delay that is greater than or equal to Y ms and that is between an end time of transmission of a downlink channel carrying each of the M TBs scheduled by the DCI and an ACK/NACK corresponding to the TB. For example, meanings of the foregoing symbols are as follows:

A1 and A2 are specified values, A1 and A2 may be integers greater than or equal to 0, or A1 and A2 may be even numbers greater than or equal to 0. For example, A1=0 and A2=8; A1=0 and A2=9; A1=0 and A2=10; A1=0 and A2=11; or A1=0 and A2=16.

B1, B2, B3, and B4 are specified values, and B1, B2, B3, and B4 may be integers greater than or equal to 0. For example, B1=0, B2=2, B3=4, and B4=6; B1=0, B2=2, B3=4, B4=5; or B1=0, B2=4, B3=8, and B4=12.

T1 is a specified value, and T1 may bean integer greater than or equal to 0. For example, T1=0, 1, or 2.

T2 is a specified value, and T2 is a positive integer. For example, T2=11, 12, 13, or 14, or T2 is determined by using the third indication information in the DCI. It should be noted that, a value of T2 is greater than that of T1.

Y is a specified value, and Y is an integer greater than or equal to 0, for example, Y=12.

It should be noted that the subcarrier bandwidth in the embodiments of this application may also be referred to as a subcarrier spacing. General descriptions are provided herein, and details are not described below.

According to a third aspect, a data scheduling method and a corresponding communication apparatus are provided. In this solution, a terminal device receives downlink control information DCI from a network device, where the DCI includes first indication information and second indication information, the first indication information is used to indicate a number N of transport blocks TBs scheduled by the DCI, and the second indication information is used to determine a first delay. The terminal device determines that an uplink channel carrying M TBs is transmitted in consecutive third uplink time units, where the M TBs are first M TBs in the N TBs scheduled by the DCI, a start time of the third uplink time units is determined based on an end time of transmission of the DCI and the first delay, and M is a positive integer greater than 1 and less than or equal to N. The terminal device sends the uplink channel carrying the M TBs to the network device in the third uplink time units. In this embodiment of this application, when one piece of DCI schedules a plurality of TBs, the uplink channel carrying the M TBs is transmitted in the consecutive third uplink time units, and the start time of the third uplink time units is determined based on the end time of transmission of the DCI and the first delay. Therefore, resource allocation of the M TBs is not limited, thereby improving resource allocation flexibility.

In a possible design, if N=M+S, and S is a positive integer, after the terminal device sends the uplink channel carrying the M TBs to the network device in the third uplink time units, the solution provided in this embodiment of this application further includes: The terminal device determines that an uplink channel carrying S TBs is transmitted in consecutive fourth uplink time units, where the S TBs are last S TBs in the N TBs scheduled by the DCI, and a start time of the fourth uplink time units is determined based on an end time of the third uplink time units and predefined duration. The terminal device sends the uplink channel carrying the S TBs to the network device in the fourth uplink time units. Based on this solution, when one piece of DCI schedules a plurality of TBs, resource allocation flexibility can be improved, and discontinuous transmission of the TBs can be implemented.

According to a fourth aspect, a data scheduling method and a corresponding communication apparatus are provided. In this solution, a network device sends downlink control information DCI to a terminal device, where the DCI includes first indication information and second indication information, the first indication information is used to indicate a number N of transport blocks TBs scheduled by the DCI, and the second indication information is used to determine a first delay. The network device determines that an uplink channel carrying M TBs is transmitted in consecutive third uplink time units, where the M TBs are first M TBs in the N TBs scheduled by the DCI, a start time of the third uplink time units is determined based on an end time of transmission of the DCI and the first delay, and M is a positive integer greater than 1 and less than or equal to N. The network device receives the uplink channel carrying the M TBs from the terminal device in the third uplink time units.

In a possible design, if N=M+S, and S is a positive integer, after the network device receives the uplink channel carrying the M TBs from the terminal device in the third uplink time units, the solution provided in this embodiment of this application further includes: The network device determines that an uplink channel carrying S TBs is transmitted in consecutive fourth uplink time units, where the S TBs are last S TBs in the N TBs scheduled by the DCI, and a start time of the fourth uplink time units is determined based on an end time of the third uplink time units and predefined duration. The network device receives the uplink channel carrying the S TBs from the terminal device in the fourth uplink time units.

For technical effects brought by any design manner of the fourth aspect, refer to technical effects brought by different design manners of the third aspect. Details are not described herein again.

With reference to the third aspect or the fourth aspect, in a possible design, the consecutive third uplink time units are N5 consecutive uplink slots, where N5 is determined based on M, $N_{Rep}$, $N_{RU}$, and $N_{slots}^{UL}$, $N_{Rep}$ is determined based on a repetition number field in the DCI. $N_{RU}$ is determined based on a resource assignment field in the DCI, and $N_{slots}^{UL}$ indicates a number of uplink slots in one resource unit.

With reference to the third aspect or the fourth aspect, in a possible design, N5, M, $N_{Rep}$, $N_{RU}$, and $N_{slots}^{UL}$ satisfy: $N5=MN_{Rep}N_{RU}N_{slots}^{UL}$.

With reference to the third aspect or the fourth aspect, in a possible design, the consecutive fourth uplink time units are N6 consecutive uplink slots, where N6 is determined based on S, $N_{Rep}$, $N_{RU}$, and $N_{slots}^{UL}$, $N_{Rep}$ is determined based on a repetition number field in the DCI, $N_{RU}$ is determined based on a resource assignment field in the DCI, and $N_{slots}^{UL}$ indicates a number of uplink slots in one resource unit.

With reference to the third aspect or the fourth aspect, in a possible design, N6, S, $N_{Rep}$, $N_{RU}$, and $N_{slots}^{UL}$ satisfy: $N6=SN_{Rep}N_{RU}N_{slots}^{UL}$.

According to a fifth aspect, a communication apparatus is provided, to implement the foregoing methods. The communication apparatus may be the terminal device in the first aspect or the third aspect, or an apparatus including the terminal device. Alternatively, the communication apparatus may be the network device in the second aspect or the fourth aspect, or an apparatus including the network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a sixth aspect, a communication apparatus is provided, and includes a processor and a memory. The memory is configured to store computer instructions. When the processor executes the instructions, the communication apparatus is enabled to perform the method according to any one of the foregoing aspects. The communication apparatus may be the terminal device in the first aspect or the third aspect, or an apparatus including the terminal device. Alternatively, the communication apparatus may be the network device in the second aspect or the fourth aspect, or an apparatus including the network device.

According to a seventh aspect, a communication apparatus is provided, and includes a processor. The processor is configured to: be coupled to a memory, and after reading instructions in the memory, perform the method according to any one of the foregoing aspects according to the instructions. The communication apparatus may be the terminal device in the first aspect or the third aspect, or an apparatus including the terminal device. Alternatively, the communication apparatus may be the network device in the second aspect or the fourth aspect, or an apparatus including the network device.

According to an eighth aspect, a computer-readable storage medium is provided. The computer-readable storage medium stores instructions. When the instructions are run on a computer, the computer is enabled to perform the method according to any one of the foregoing aspects.

According to a ninth aspect, a computer program product including instructions is provided. When the computer program product is run on a computer, the computer is enabled to perform the method according to any one of the foregoing aspects.

According to a tenth aspect, a communication apparatus (where for example, the communication apparatus may be a chip or a chip system) is provided. The communication apparatus includes a processor, configured to implement the function in any one of the foregoing aspects. In a possible design, the communication apparatus further includes a memory. The memory is configured to store program instructions and data that are necessary. When the communication apparatus is a chip system, the communication apparatus may include a chip, or may include a chip and another discrete component.

For technical effects brought by any design manner of the fifth aspect to the tenth aspect, refer to technical effects brought by different design manners of the first aspect, the second aspect, the third aspect, or the fourth aspect. Details are not described herein again.

According to an eleventh aspect, a communication system is provided. The communication system includes the terminal device in the foregoing aspects and the network device in the foregoing aspects.

DESCRIPTION OF EMBODIMENTS

Figure 1A:
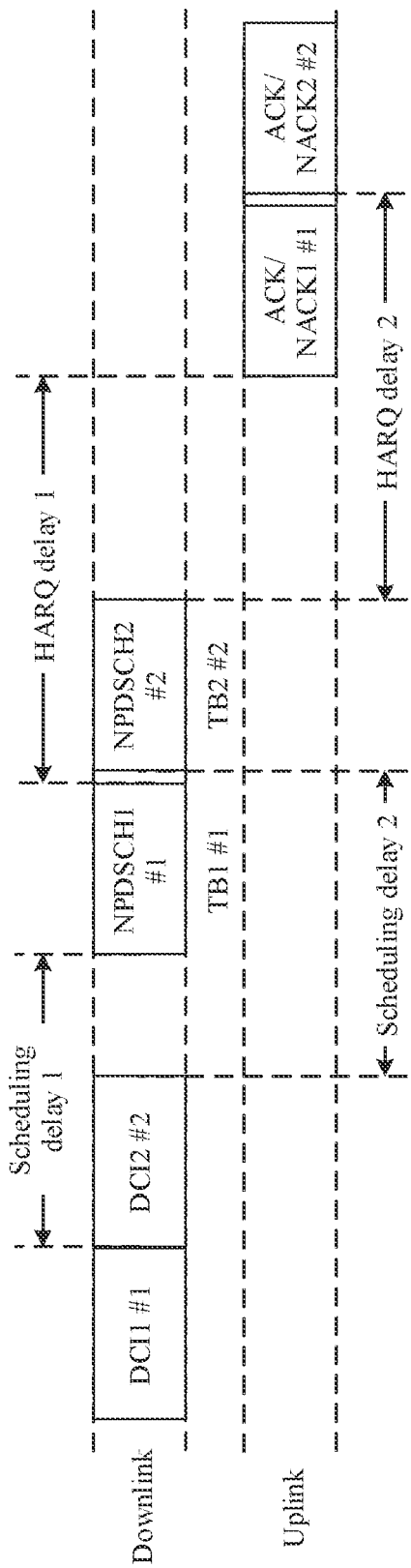
FIG. 1a is a schematic diagram of existing downlink scheduling.
Figure 1B:
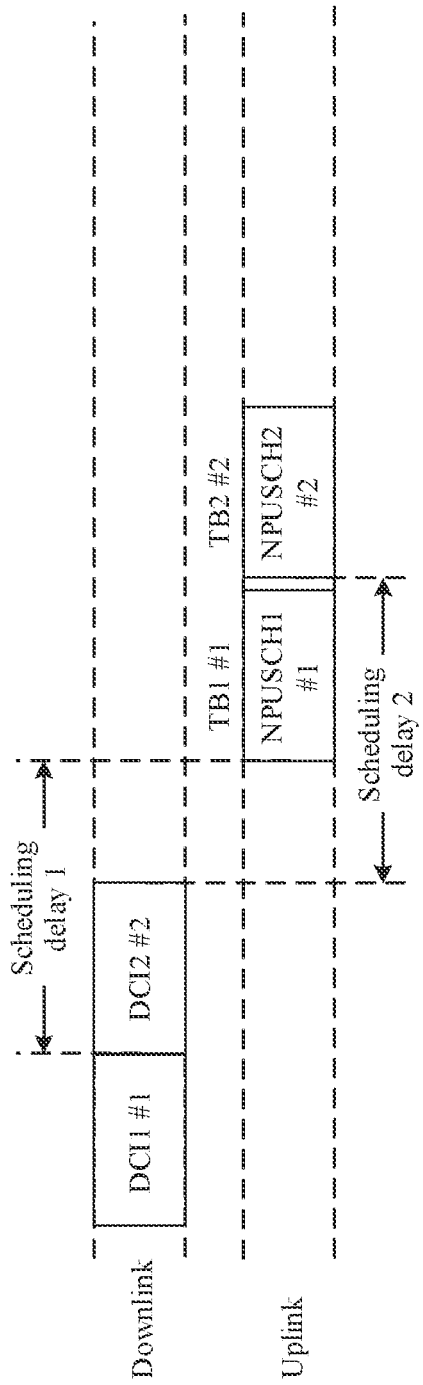
FIG. 1b is a schematic diagram of existing uplink scheduling.

For ease of understanding of technical solutions in embodiments of this application, the following first briefly describes technologies or nouns related to this application.

1. IoT:

IoT is an "internet in which things are interconnected". Internet of users is extended to internet of things through the IoT, so that information exchange and communication can be carried out between any things. Such communication manner is also referred to as machine type communication (MTC). A communication node is referred to as an MTC terminal or an MTC device. Typical IoT applications include a smart grid, smart agriculture, smart transportation, smart household, environment detection, and the like.

The internet of things needs to be applied to a plurality of scenarios, for example, from outdoor to indoor, and from overground to underground. Therefore, many special requirements are imposed on a design of the internet of things. For example, an MTC terminal in some scenarios is used in an environment with poor coverage. For example, a water meter or an electric meter is usually mounted indoors, even in a basement, or other places with poor wireless network signals. Therefore, a coverage enhancement technology is required to resolve this problem. Alternatively, a number of MTC terminals in some scenarios is far greater than a number of devices for human-to-human communication, that is, large-scale deployment is required. Therefore, an MTC terminal needs to be obtained and used at very low costs. Alternatively, because a data packet transmitted by an MTC terminal in some scenarios is small, and the data packet transmitted by the MTC terminal is insensitive to a delay. Therefore, an MTC terminal with a low rate needs to be supported. Alternatively, in most cases, an MTC terminal is powered by using a battery. However, in many scenarios, the MTC terminal needs to be used for more than 10 years without replacing the battery. Therefore, the MTC terminal needs to work with very low power consumption.

To satisfy the above requirements, the mobile communications standards organization 3GPP adopted a new research project at the RAN #62 conference to study a method for supporting the IoT with very low complexity and low costs in a cellular network, and initiated an NB-IoT project at the RAN #69 conference.

2. HARQ:

The HARQ is a technology in which forward error correction (FEC) and automatic repeat request (ARQ) methods are combined. In the FEC, redundant information is added to enable a receive end to correct some errors, thereby reducing a number of retransmissions. For an error that cannot be corrected through the FEC, the receive end requests, in an ARQ mechanism, a transmit end to retransmit a TB. The receive end uses an error-detection code, namely, a cyclic redundancy check (CRC), to detect whether an error occurs in the received TB. If no error is detected by the receive end, the receive end sends an ACK to the transmit end; and after receiving the ACK, the transmit end sends a next TB. Alternatively, if the receive end detects an error, the receive end sends a negative acknowledgement NACK to the transmit end; and after receiving the NACK, the transmit end resends the previous TB to the receive end.

A HARQ protocol exists at both the transmit end and the receive end, and HARQ operations of the transmit end include sending and retransmitting a TB, receiving and processing an ACK or NACK, and the like. HARQ operations of the receive end include receiving a TB, generating an ACK or NACK, and the like.

In addition, HARQ processes are classified into an uplink HARQ and a downlink HARQ. The downlink HARQ is for a TB carried on a downlink shared channel (DL-SCH), and the uplink HARQ is for a TB carried on an uplink shared channel (DL-SCH). Specifically, the uplink HARQ is a processing procedure of acknowledging and retransmitting a TB sent by a terminal device to a network device. The downlink HARQ is a processing procedure of acknowledging and retransmitting a TB sent by a network device to a terminal device. The data scheduling method provided in the embodiments of this application mainly relates to the downlink HARQ.

3. Valid Subframe:

A definition of a valid subframe is related to a specific communication system.

An NB-IoT system is used as an example. A valid subframe may be referred to as an NB-IoT downlink subframe (NB-IoT DL subframe). In the following cases, a terminal device in the NB-IoT system should assume that a subframe is an NB-IoT downlink subframe.

For example, the terminal device determines that a subframe, in which transmission of a narrowband primary synchronization signal (NPSS), narrowband secondary synchronization signal (NSSS), narrowband physical broadcast channel (NPBCH), or system information block type1-NB is not included, is an NB-IoT downlink subframe.

Alternatively, the terminal device receives a configuration parameter, and the configuration parameter is used to configure the NB-IoT downlink subframe. Further, the terminal device may determine the NB-IoT downlink subframe based on the configuration parameter. The configuration parameter may be configured by using a system message or RRC signaling. This is not specifically limited in the embodiments of this application.

An eMTC system is used as an example. A valid subframe may be referred to as a bandwidth-reduced low-complexity or coverage enhanced (BL/CE) downlink subframe. The BL/CE downlink subframe may be configured by using a configuration parameter, and the configuration parameter is configured by using a system message or RRC signaling.

4. Scheduling Delay and HARQ Delay:

Scheduling delays are classified into a downlink scheduling delay and an uplink scheduling delay.

The downlink scheduling delay refers to a length of time between an end moment of transmission of DCI and a start moment of transmission of a NPDSCH carrying a TB scheduled by the DCI. The downlink scheduling delay includes a fixed delay of 4 ms and a dynamic indication delay. The dynamic indication delay is indicated by using a scheduling delay field in the DCI, and a name of the field in a DCI format N1 is "scheduling delay". For example, the dynamic indication delay indicated by the scheduling delay field ($I_{Delay}$) may be shown in Table 1.

TABLE 1

| $I_{Delay}$ | Dynamic indication delay | |
|---|---|---|
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Figure 1C:
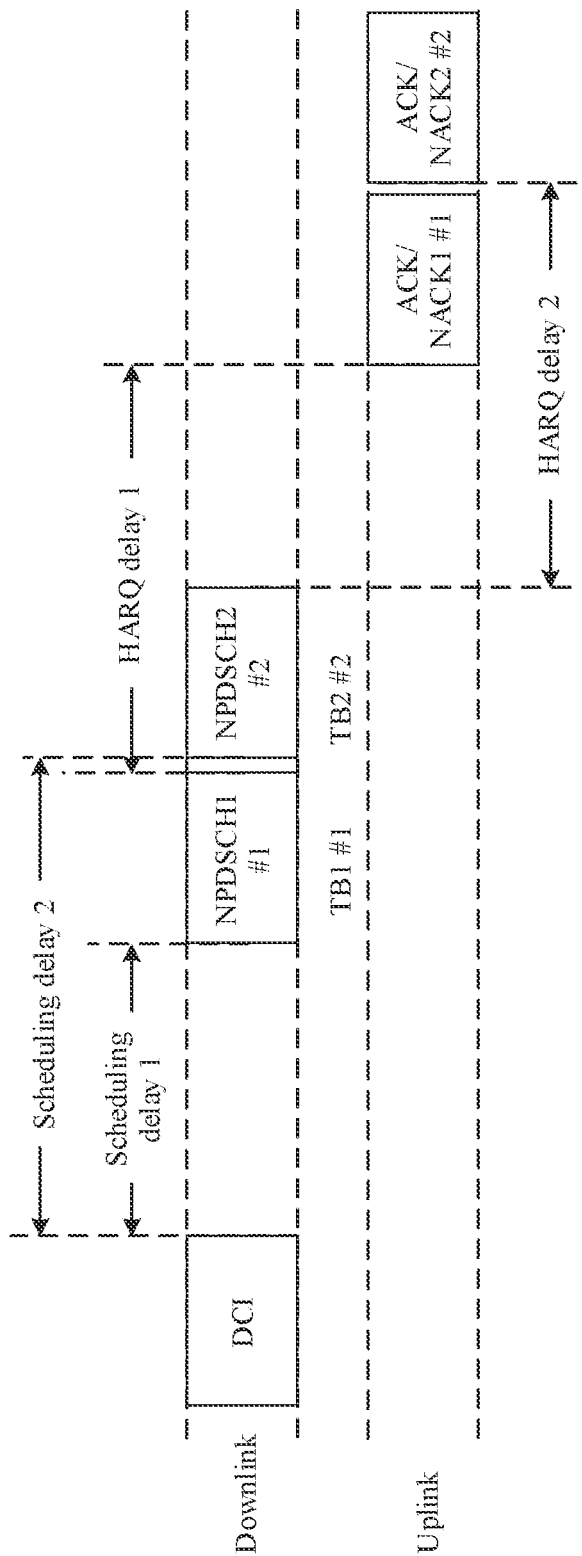
FIG. 1c is a schematic diagram of an application of an existing downlink scheduling mechanism in the Rel 16 of an NB-IoT system.

$R_{max}$ in Table 1 is a maximum number of repetitions of narrowband physical downlink control channel (NPDCCH) UE-specific search space (USS), and this parameter is notified by the network device to the terminal device by using signaling. It can be deduced from Table 1 that current downlink scheduling delays are some fixed values whose values are relatively small. Transmission duration of a NPDSCH1 #1 in FIG. 1c can be at most equal to a difference between a downlink scheduling delay 2 and a downlink scheduling delay 1. Therefore, resource allocation of the NPDSCH1 #1 in two HARQ scheduling is greatly limited.

The uplink scheduling delay refers to a length of time between the end moment of transmission of the DCI and a start moment of transmission of a NPUSCH carrying a TB scheduled by the DCI. The uplink scheduling delay is indicated by using a scheduling delay field in the DCI, and a name of the field in a DCI format N0 is "scheduling delay". For example, the uplink scheduling delay indicated by the scheduling delay field may be shown in Table 2.

TABLE 2

| $I_{Delay}$ | Uplink scheduling delay |
|---|---|
| 0 | 8 |
| 1 | 16 |
| 2 | 32 |
| 3 | 64 |

Figure 1D:
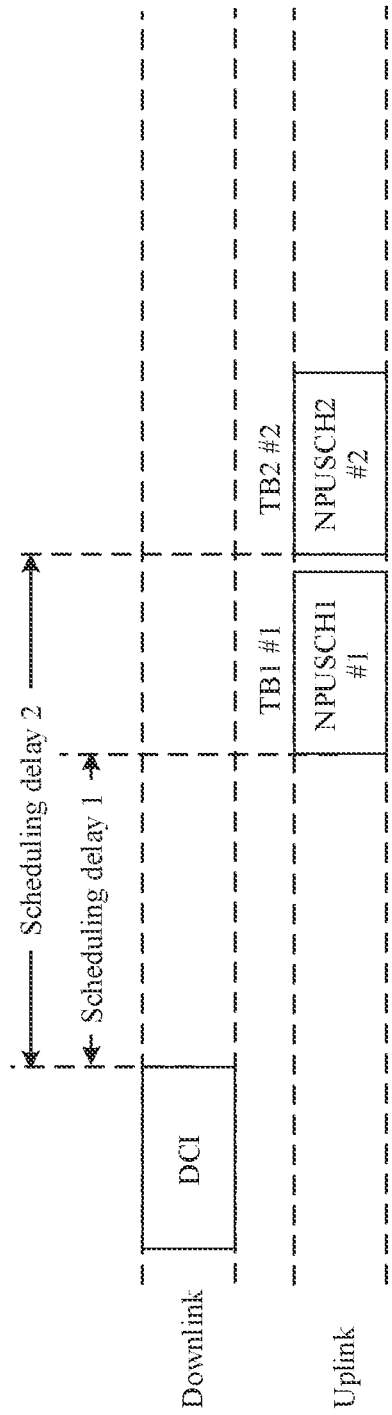
FIG. 1d is a schematic diagram of an application of an existing uplink scheduling mechanism in the Rel 16 of an NB-IoT system.

It can be learned from Table 2 that current uplink scheduling delays are some fixed values whose values are relatively small. Transmission duration of a NPUSCH1 #1 in FIG. 1d can be at most equal to a difference between an uplink scheduling delay 2 and an uplink scheduling delay 1. Therefore, resource allocation of the NPUSCH1 #1 in two HARQ scheduling is greatly limited.

The HARQ delay is a length of time between an end moment of transmission of the NPDSCH carrying the TB scheduled by the DCI and a start moment of transmission of an ACK or NACK corresponding to the TB. The HARQ delay is indicated by using an ACK/NACK resource field in DCI, and a name of the field in the DCI format N1 is "HARQ-ACK resource". For example, a subcarrier location of the ACK/NACK and a HARQ delay that are indicated by the ACK/NACK resource field may be shown in Table 3 (corresponding to a scenario in which a subcarrier bandwidth for transmitting the ACK/NACK is 3.75 kHz) or Table 4 (corresponding to a scenario in which a subcarrier bandwidth for transmitting the ACK/NACK is 15 kHz). $k_0-1$ in Table 3 or Table 4 indicates the HARQ delay. That is, a minimum value of the HARQ delay is 12 ins. It can be learned from Table 3 and Table 4 that current HARQ delays are some fixed values whose values are relatively small. Transmission duration of an ACK/NACK1 #1 in FIG. 1c can be at most equal to a difference between a HARQ delay 2 and a HARQ delay 1. Therefore, resource allocation of the ACK/NACK1 #1 in two HARQ scheduling is greatly limited.

TABLE 3

| ACK/NACK resource field | Subcarrier location of ACK/NACK | $k_0$ |
|---|---|---|
| 0 | 38 | 13 |
| 1 | 39 | 13 |
| 2 | 40 | 13 |
| 3 | 41 | 13 |
| 4 | 42 | 13 |
| 5 | 43 | 13 |
| 6 | 44 | 13 |
| 7 | 45 | 13 |
| 8 | 38 | 21 |
| 9 | 39 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

TABLE 4

| ACK/NACK resource field | Subcarrier location of ACK/NACK | $k_0$ |
|---|---|---|
| 0 | 0 | 13 |
| 1 | 1 | 13 |
| 2 | 2 | 13 |
| 3 | 3 | 13 |
| 4 | 0 | 15 |
| 5 | 1 | 15 |
| 6 | 2 | 15 |
| 7 | 3 | 15 |
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

The following describes the technical solutions in the embodiments of this application with reference to the accompanying drawings in the embodiments of this application. In the descriptions of this application, '/' represents an "or" relationship between associated objects unless otherwise specified. For example, A/B may represent A or B. The term "and/or" in this application indicates only an association relationship for describing associated objects and indicates that three relationships may exist. For example. A and/or B may indicate the following three cases: Only A exists, both A and B exist, and only B exists, where A and B may be singular or plural. In addition, unless otherwise specified, "a plurality of" in the descriptions of this application means two or more. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms, such as "first" and "second", are not intended to limit a number or an execution sequence; and the terms, such as "first" and "second", do not indicate a definite difference. In addition, in the embodiments of this application, a word such as "example" or "for example" is used to represent giving an example, an illustration, or a description. Any embodiment or design scheme described as an "example" or "for example" in the embodiments of this application should not be explained as being preferable or having more advantages than another embodiment or design scheme. Exactly, use of the word such as "example" or "for example" is intended to present a relative concept in a specific manner for ease of understanding.

The embodiments of this application are applicable to an LTE system such as an NB-IoT system, or applicable to another wireless communication system, such as a global system for mobile communications (GSM), a universal mobile communication system (universal mobile telecommunications system, UMTS), a code division multiple access (CDMA) system, a wideband code division multiple access (WCDMA) system, or a new future-oriented network device system. This is not specifically limited in the embodiments of this application. The foregoing communication systems applicable to this application are merely examples for description, and communication systems applicable to this application are not limited thereto. General descriptions are provided herein, and details are not described below. In addition, the terms "system" and "network" may be interchanged.

Figure 2:
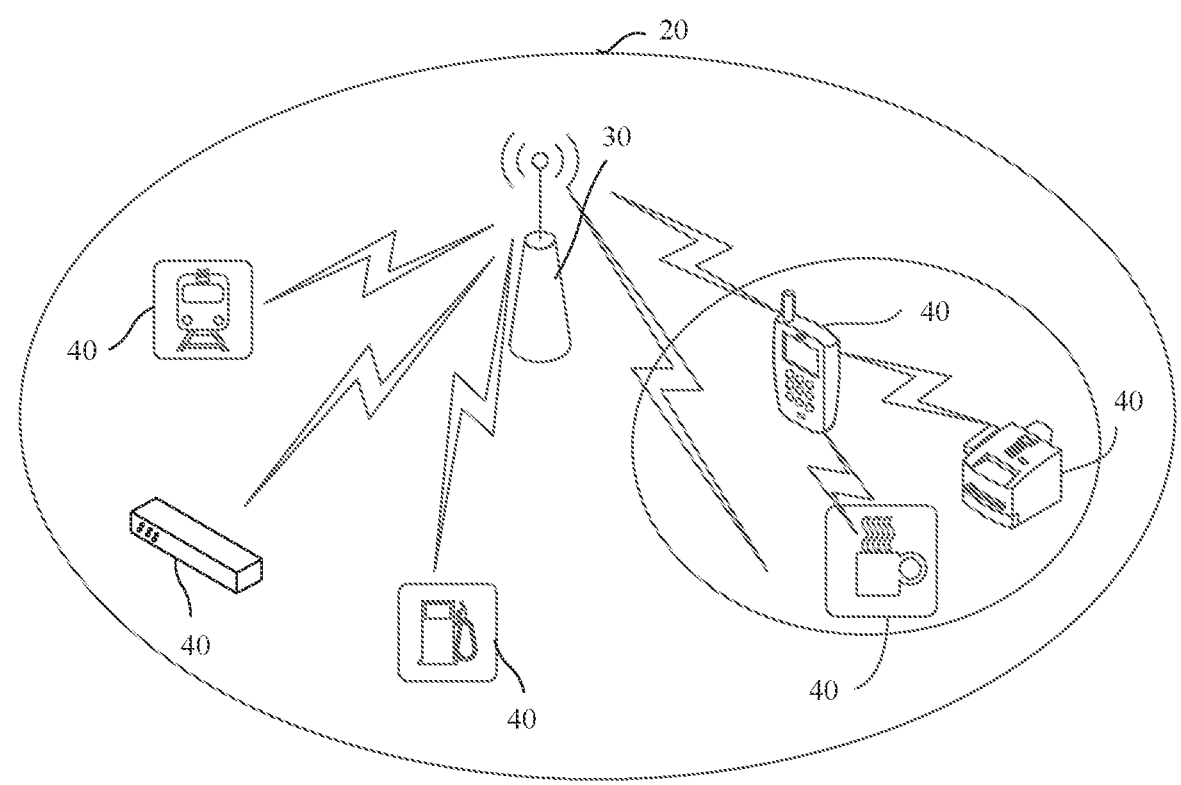
FIG. 2 is a schematic architectural diagram of a communication system according to an embodiment of this application.

FIG. 2 shows a communication system 20 according to an embodiment of this application. The communication system 20 includes a network device 30 and one or more terminal devices 40 connected to the network device 30. Optionally, different terminal devices 40 may communicate with each other.

For example, the network device 30 shown in FIG. 2 interacts with any terminal device 40. In this embodiment of this application, for downlink scheduling:

The network device 30 sends DCI to the terminal device 40, where the DCI schedules N TBs. After determining that a downlink channel carrying the M TBs is transmitted in consecutive first downlink time units, the network device 30 sends the downlink channel carrying the M TBs to the terminal device 40 in the first downlink time units. After receiving the DCI, and determining that the downlink channel carrying M TBs is transmitted in the consecutive first downlink time units, the terminal device 40 receives the downlink channel carrying the M TBs from the network device 30 in the first downlink time units, where the M TBs are first M TBs in the N TBs, a start time of the first downlink time units is determined based on an end time of transmission of the DCI and a first delay, N is a positive integer greater than 1, and M is a positive integer greater than 1 and less than or equal to N. After determining that ACKs or NACKs corresponding to the M TBs are transmitted in consecutive first uplink time units, the terminal device 40 sends the ACKs or NACKs corresponding to the M TBs to the network device 30 in the first uplink time units. After determining that the ACKs or NACKs corresponding to the M TBs are transmitted in the consecutive first uplink time units, the network device 30 receives the ACKs or NACKs corresponding to the M TBs from the terminal device 40 in the first uplink time units, where a start time of the first uplink time units is determined based on an end time of the first downlink time units and a second delay. A specific implementation of this solution is to be described in subsequent method embodiments. Details are not described herein. Based on this solution, when one piece of DCI schedules a plurality of TBs, in this embodiment of this application, the downlink channel carrying the M TBs is transmitted in the consecutive first downlink time units, and the start time of the first downlink time units is determined based on the end time of transmission of the DCI and the first delay. Therefore, resource allocation of the M TBs is not limited. In addition, in this embodiment of this application, the ACKs or NACKs corresponding to the M TBs are transmitted in the consecutive first uplink time units, and the start time of the first uplink time units is determined based on the end time of the first downlink time units and the second delay. Therefore, resource allocation of the ACKs or NACKs corresponding to the M TBs is not limited either. In conclusion, based on the solution provided in this embodiment of this application, resource allocation flexibility can be improved when one piece of DCI schedules a plurality of TBs.

Alternatively, for example, the network device 30 shown in FIG. 2 interacts with any terminal device 40. In this embodiment of this application, for uplink scheduling.

The network device 30 sends DCI to the terminal device 40, where the DCI includes first indication information and second indication information, the first indication information is used to indicate a number N of TBs scheduled by the DCI, and the second indication information is used to determine a first delay. After receiving the DCI from the network device 30, and determining that an uplink channel carrying M TBs is transmitted in consecutive third uplink time units, the terminal device 40 sends the uplink channel carrying the M TBs to the network device in the third uplink time units. After determining that the uplink channel carrying M TBs is transmitted in the consecutive third uplink time units, the network device 30 receives the uplink channel carrying the M TBs from the terminal device 40 in the third uplink time units, where the M TBs are first M TBs in the N Tbs scheduled by the DCI, a start time of the third uplink time units is determined based on an end time of transmission of the DCI and the first delay, N is a positive integer greater than 1, and M is a positive integer greater than 1 and less than or equal to N. A specific implementation of this solution is to be described in subsequent method embodiments. Details are not described herein. Based on this solution, when one piece of DCI schedules a plurality of TBs, in this embodiment of this application, the uplink channel carrying the M TBs is transmitted in the consecutive third uplink time units, and the start time of the third uplink time units is determined based on the end time of transmission of the DCI and the first delay. Therefore, resource allocation of the M TBs is not limited, thereby improving resource allocation flexibility.

Optionally, the M TBs in this embodiment of this application may be corresponding to a same HARQ process or corresponding to different HARQ processes. General descriptions are provided herein, and details are not described below.

It should be noted that the DCI in this embodiment of this application also supports scheduling of one TB. When the DCI schedules one TB, a scheduling delay and a HARQ delay may be indicated by using an existing technology. General descriptions are provided herein, and details are not described below.

Optionally, the network device 30 in this embodiment of this application is a device for connecting the terminal device 40 to a wireless network, and may be an evolved NodeB (eNB, or eNodeB) in long term evolution (LTE), a base transceiver station (BTS) in GSM or CDMA, a NodeB in a WCDMA system, a base station in a 5th generation (5G) network or future evolved public land mobile network (PLMN), a broadband network gateway (BNG), an aggregation switch, a 3rd generation partnership project (3GPP) access device, or the like. This is not specifically limited in this embodiment of this application. Optionally, the base station in this embodiment of this application may include base stations in various forms, for example, a macro base station, a micro base station (which is also referred to as a small cell), a relay station, and an access point. This is not specifically limited in this embodiment of this application.

Optionally, the terminal device 40 in this embodiment of this application may be a device, such as a terminal or a chip that may be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in the 5G network or future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine, a wireless terminal in smart grid (smart grid), a wireless terminal in transportation safety, a wireless terminal in smart city, a wireless terminal in smart home, or the like. The terminal may be mobile or fixed.

Optionally, the network device 30 and the terminal device 40 in this embodiment of this application may also be referred to as communication apparatuses, and each may be a general-purpose device or a dedicated device. This is not specifically limited in this embodiment of this application.

Figure 3:
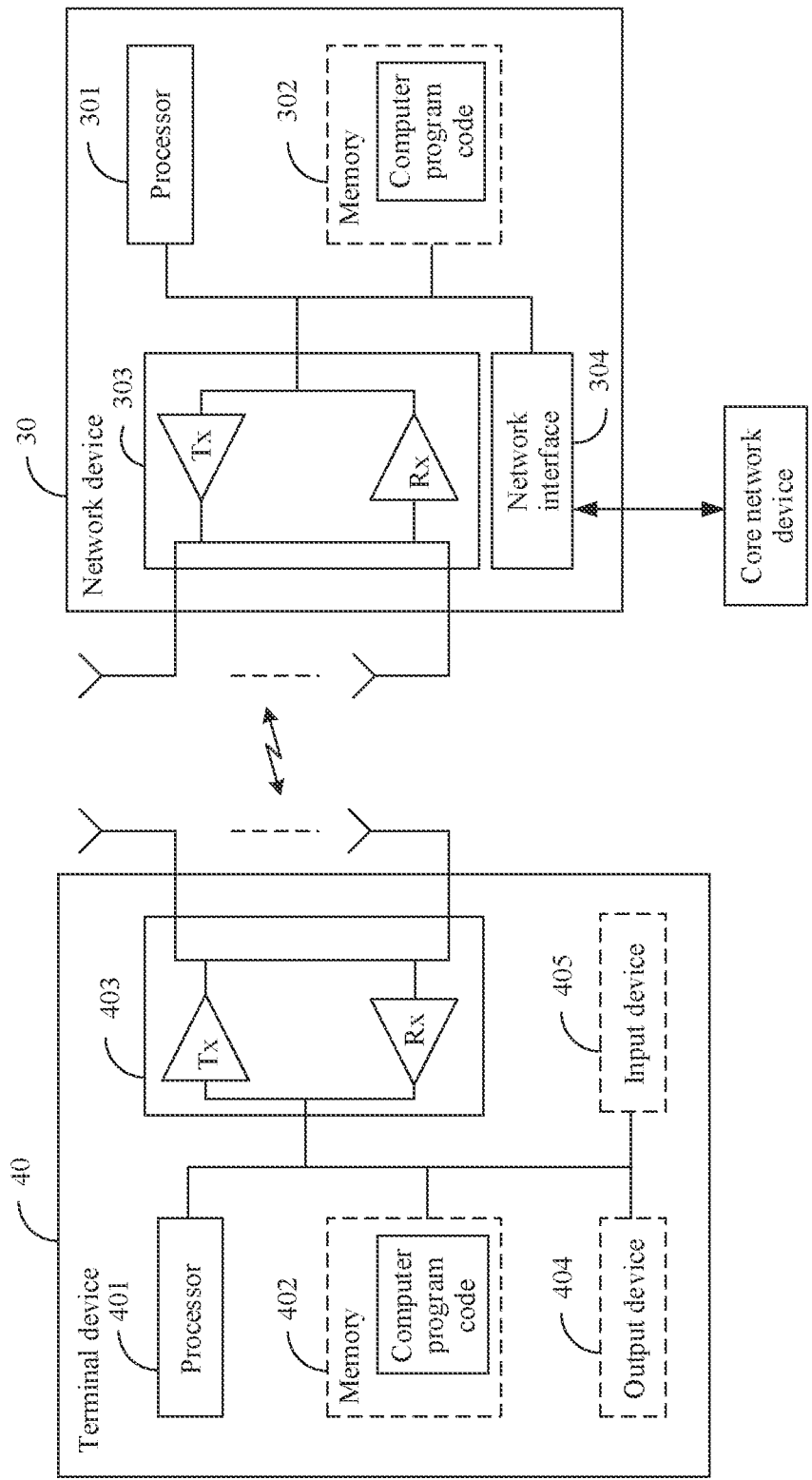
FIG. 3 is a schematic structural diagram of a terminal device and a network device according to an embodiment of this application.

Optionally, FIG. 3 is a schematic structural diagram of the network device 30 and the terminal device 40 according to this embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). Optionally, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected by using a communication line. The communication line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. In a specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, and/or processing cores configured to process data (for example, computer program instructions).

The memory 402 may be an apparatus having a storage function. For example, the memory 402 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a blu-ray optical disc, or the like), a magnetic disk storage medium or another magnetic storage device, or any other computer-accessible medium that can be used to carry or store desired program code in an instruction or data structure form, but is not limited thereto. The memory 402 may exist independently, and is connected to the processor 401 by using the communication line. Alternatively, the memory 402 may be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the data scheduling method provided in the embodiments of this application.

Alternatively, optionally, in this embodiment of this application, the processor 401 may perform related processing functions in the data scheduling method provided in the following embodiments of this application. The transceiver 403 is responsible for communicating with another device or another communication network. This is not specifically limited in this embodiment of this application.

Optionally, the computer-executable instructions in this embodiment of this application may also be referred to as application program code or computer program code. This is not specifically limited in this embodiment of this application.

The transceiver 403 may be any type of apparatus using a transceiver, and is configured to communicate with another device or a communication network such as an Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). Optionally, the network device 30 may further include at least one memory (an example in which the network device 30 includes one memory 302 is used for description in FIG. 3). The processor 301, the memory 302, the transceiver 303, and the network interface 304 are connected by using a communication line. The network interface 304 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 4:
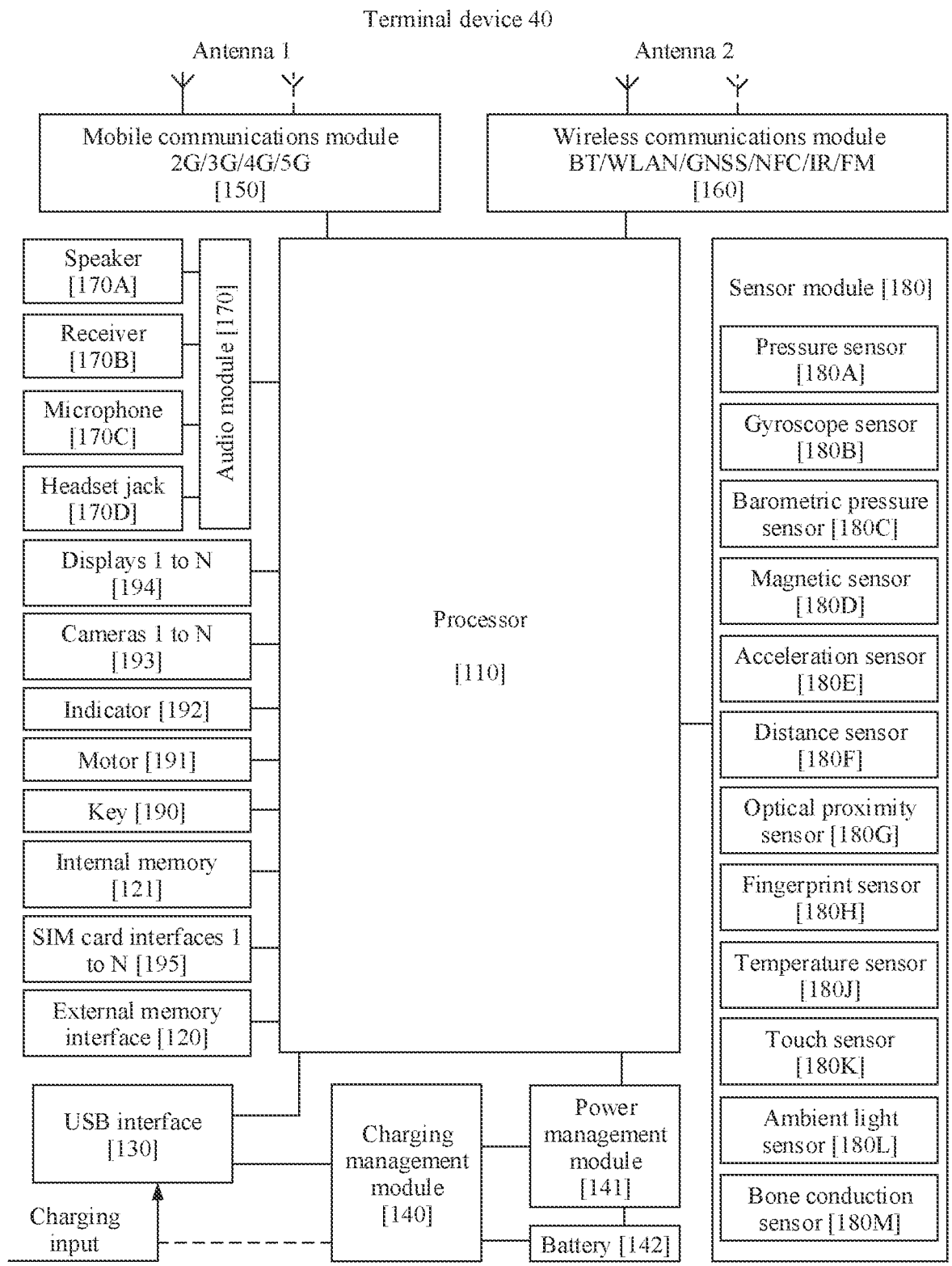
FIG. 4 is another schematic structural diagram of a terminal device according to an embodiment of this application.

With reference to the schematic structural diagram of the terminal device 40 shown in FIG. 3, for example, FIG. 4 is a specific structural form of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communication module 150, a wireless communication module 160, and the like in FIG. 4.

The antenna 1 and the antenna 2 are configured to transmit and receive an electromagnetic wave signal Each antenna in the terminal device 40 may be configured to cover one or more communication frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the terminal device 40 and that is for wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation by using the antenna 1. In some embodiments, at least some function modules of the mobile communication module 150 may be disposed in the processor 110. In some embodiments, at least some function modules in the mobile communication module 150 and at least some modules in the processor 110 may be disposed in a same device.

The wireless communication module 160 may provide a solution that is applied to the terminal device 40 and that is for wireless communication such as a wireless local area network (WLAN) (for example, a Wi-Fi network), Bluetooth (BT), a global navigation satellite system (GNSS), frequency modulation (FM), near field communication (NFC) technology, or an infrared (IR) technology. The wireless communication module 160 may be one or more devices integrating at least one communications processor module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation by using the antenna 2. When the terminal device 40 is a first device, that the wireless communication module 160 may provide a solution that is applied to the terminal device 40 and that is for NFC wireless communication means that the first device includes an NFC chip. The NFC chip can improve an NFC wireless communication function. When the terminal device 40 is a second device, that the wireless communication module 160 may provide a solution that is applied to the terminal device 40 and that is for NFC wireless communication means that the first device includes an electronic label (such as a radio frequency identification (RFID) label). An NFC chip, near the electronic label, of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, or the like. The GNSS may include a global positioning system (GPS), a global navigation satellite system (GLONASS), a BeiDou navigation satellite system (BDS), a quasi-zenith satellite system (QZSS), or satellite based augmentation systems (SBAS).

In some embodiments, a function of the memory 402 in FIG. 3 may be implemented by using an internal memory 121, an external memory (such as a Micro SD card) connected to an external memory interface 120 in FIG. 4, or the like.

In some embodiments, a function of the output device 404 in FIG. 3 may be implemented by using a display 194 in FIG. 4. The display 194 is configured to display an image, a video, and the like. The display 194 includes a display panel.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C, a headset jack 170D, or the like. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by using hardware, software, or a combination of software and hardware.

With reference to FIG. 2 to FIG. 4, the following describes in detail the data scheduling method provided in the embodiments of this application by using an example in which the network device 30 interacts with any terminal device 40 in FIG. 2.

It should be noted that in the following embodiments of this application, names of messages between network elements, names of parameters in messages, or the like are merely examples, and may be other names in a specific implementation. This is not specifically limited in the embodiments of this application.

Figure 5:
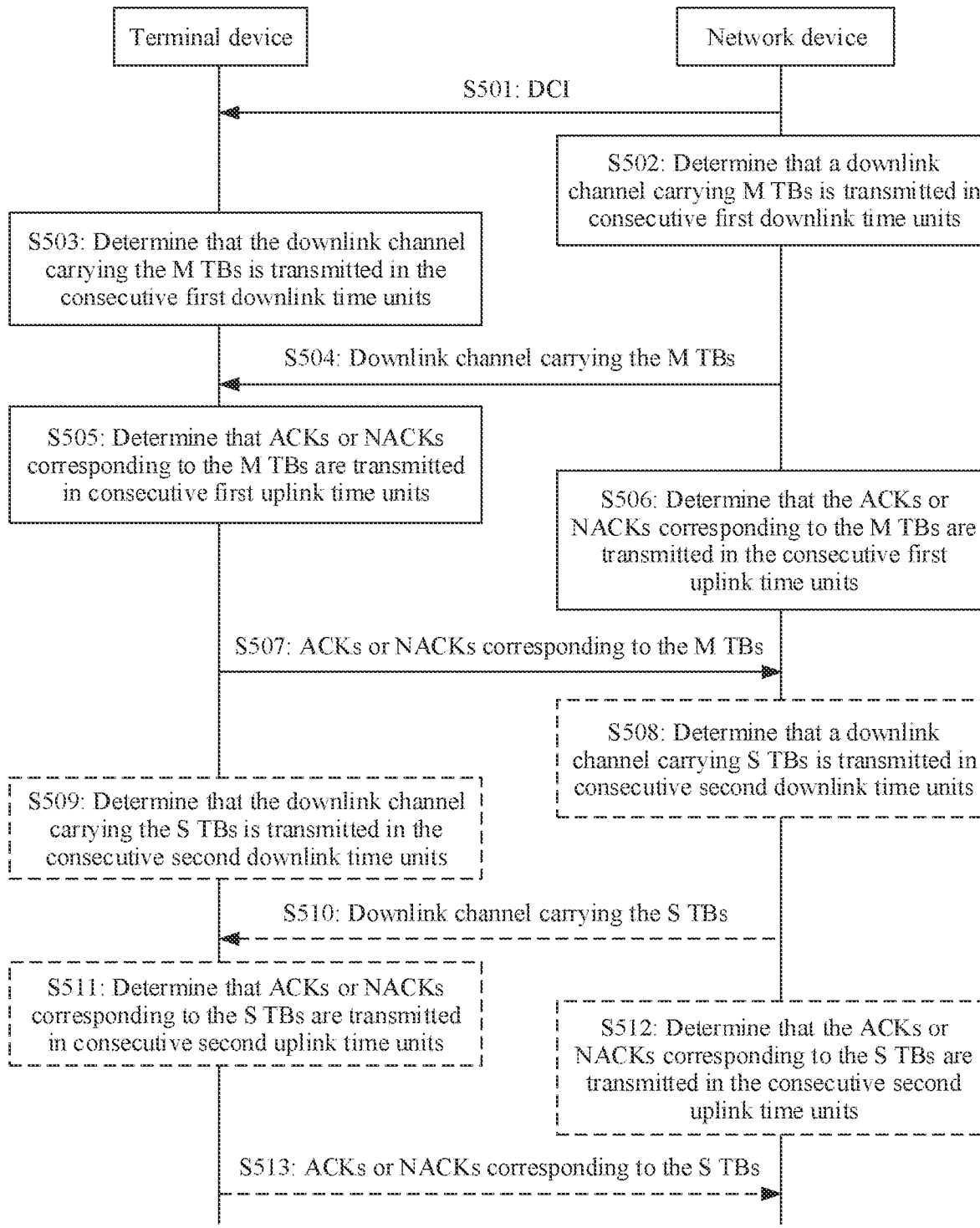
FIG. 5 is a schematic flowchart 1 of a data scheduling method according to an embodiment of this application.

FIG. 5 shows a data scheduling method according to an embodiment of this application. The data scheduling method includes the following steps S501 to S507.

S501. A network device sends DCI to a terminal device. The terminal device receives the DCI from the network device. The DCI schedules N TBs.

Optionally, the DCI may include first indication information, second indication information, and third indication information, the first indication information is used to indicate a number N of TBs scheduled by the DCI, the second indication information is used to determine a first delay, and the third indication information is used to determine a second delay, where N is a positive integer greater than 1.

S502: The network device determines that a downlink channel carrying M TBs is transmitted in consecutive first downlink time units, where the M TBs are first M TBs in the N TBs, a start time of the first downlink time units is determined based on an end time of transmission of the DCI and the first delay, and M is a positive integer greater than 1 and less than or equal to N.

It should be noted that in this embodiment of this application, steps S501 and S502 are not performed in a necessary sequence. Step S501 may be performed before step S502, step S502 may be performed before step S501, or steps S501 and S502 may be simultaneously performed. This is not specifically limited herein.

S503: The terminal device determines that the downlink channel carrying the M TBs is transmitted in the consecutive first downlink time units. For related descriptions, refer to step S502. Details are not described herein again.

It should be noted that in this embodiment of this application, steps S501 and S503 are not performed in a necessary sequence. Step S501 may be performed before step S503, step S503 may be performed before step S501, or steps S501 and S503 may be simultaneously performed. This is not specifically limited herein.

S504: The network device sends the downlink channel carrying the M TBs to the terminal device in the first downlink time units. The terminal device receives the downlink channel carrying the M TBs from the network device in the first downlink time units.

S505: The terminal device determines that ACKs or NACKs corresponding to the M TBs are transmitted in consecutive first uplink time units, where a start time of the first uplink time units is determined based on an end time of the first downlink time units and the second delay.

S506: The network device determines that the ACKs or NACKs corresponding to the M TBs are transmitted in the consecutive first uplink time units. For related descriptions, refer to step S505. Details are not described herein again.

S507: The terminal device sends the ACKs or NACKs corresponding to the M TBs to the network device in the first uplink time units. The network device receives the ACKs or NACKs corresponding to the M TBs from the terminal device in the first uplink time units.

Figure 6:
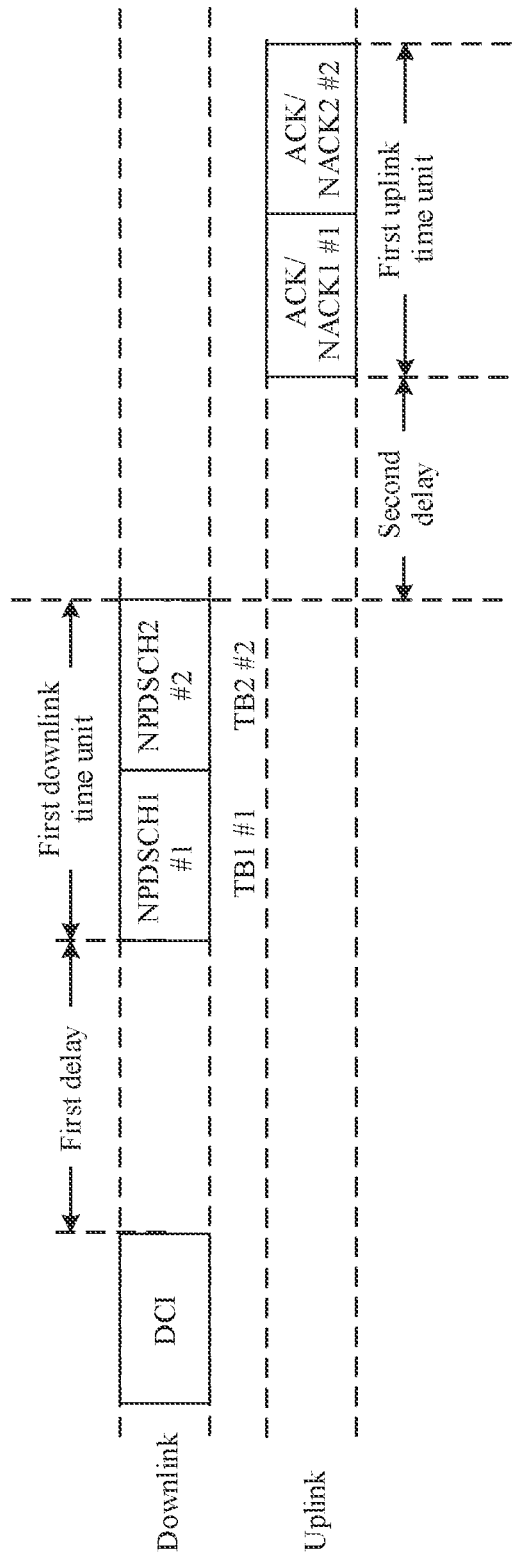
FIG. 6 is a schematic diagram 1 of downlink data scheduling according to an embodiment of this application.

In the foregoing steps S501 to S507:

For example, it is assumed that the downlink channel in this embodiment of this application may be a NPDSCH (where in the following examples, the downlink channel is a NPDSCH), N=2, and M=2 (namely, M=N). Two HARQ processes are used as an example. In this case, a schematic diagram of downlink scheduling through DCI may be shown in FIG. 6. An NPDSCH1 #1 carrying a TB1 #1 and a NPDSCH2 #2 carrying a TB2 #2 are transmitted in consecutive first downlink time units, and a start time of the first downlink time units is determined based on an end time of transmission of the DCI and a first delay. An ACK/NACK1 #1 corresponding to the TB1 #1 and an ACK/NACK2 #2 corresponding to the TB2 #2 are transmitted in consecutive first uplink time units, and a start time of the first uplink time units is determined based on an end time of the first downlink time units and a second delay.

Optionally, in this embodiment of this application, if M=N, a value of M may be indicated by using first indication information.

Optionally, in this embodiment of this application, the consecutive first downlink time units are N1 consecutive valid downlink subframes, where N1 is determined based on M, $N_{Rep}$, and $N_{SF}$, $N_{Rep}$ is determined based on a repetition number field in the DCI, and $N_{SF}$ is determined based on a resource assignment field in the DCI.

For example, N1, M, $N_{Rep}$, and $N_{SF}$ may satisfy the following formula (1):

$$N1 = M N_{Rep} N_{SF} \qquad \text{Formula (1)}$$

Figure 7:
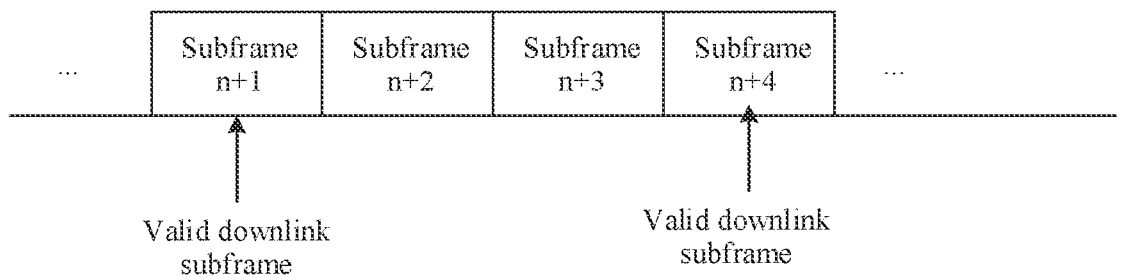
FIG. 7 is a schematic diagram of a valid subframe according to an embodiment of this application.

Optionally, in this embodiment of this application, consecutive valid downlink subframes mean that there is no valid downlink subframe between two valid downlink subframes. For example, it is assumed that, in FIG. 7, a subframe n+1 is a valid downlink subframe, a subframe n+4 is a valid downlink subframe, and a subframe n+2 and a subframe n+3 are not valid downlink subframes. In this case, the subframe n+1 and the subframe n+4 in FIG. 7 are consecutive valid downlink subframes. For related descriptions of the valid downlink subframe, refer to the part of the valid subframe in the specific implementations. Details are not described herein again.

Optionally, in this embodiment of this application, the consecutive first uplink time units are N2 consecutive uplink slots, where N2 is determined based on M, $N_{Rep}^{AN}$, and $N_{slots}^{UL}$, $N_{Rep}^{AN}$ is a number of repetitions of an ACK or NACK corresponding to each TB, and $N_{slots}^{UL}$ is a number of consecutive uplink slots corresponding to one resource unit. For example, a value of $N_{slots}^{UL}$ may be 4 specified in a protocol.

For example, N2, M, $N_{Rep}^{AN}$, and $N_{slots}^{UL}$ satisfy the following formula (2):

$$N2 = MN_{Rep}^{AN} N_{slots}^{UL} \quad \text{Formula (2)}$$

Optionally, the first indication information in this embodiment of this application may be explicit indication information. For example, the first indication information is a number N of TBs scheduled by the DCI.

Alternatively, optionally, the first indication information in this embodiment of this application may be implicit indication information. For example, the first indication information may be a k-bit bitmap. If a bit value in the k-bit bitmap is 1, it indicates one TB. In this case, bit values of N bits may be set to 1 in the k-bit bitmap to indicate the number N of TBs scheduled by the DCI. For example, an 8-bit bitmap 10011000 may indicate that the number N of TBs scheduled by the DCI is 3. Alternatively, if a bit value in the k-bit bitmap is 0, it indicates one TB. In this case, bit values of N bits may be set to 0 to indicate the number N of TBs scheduled by the DCI. For example, an 8-bit bitmap 10011100 may indicate that a number N of TBs scheduled by the DCI is 4.

After receiving the DCI from the network device, the terminal device may determine, based on the first indication information in the DCI, the number N of TBs scheduled by the DCI.

Optionally, the second indication information in this embodiment of this application may be a value in a scheduling delay field in the DCI, and the scheduling delay field is used to indicate a dynamic indication delay. The first delay in this embodiment of this application may include the dynamic indication delay and a fixed delay of 4 ms. After obtaining the DCI, the terminal device may determine the corresponding dynamic indication delay based on the scheduling delay field in the DCI, and may further determine the first delay. For example, the dynamic indication delay indicated by the scheduling delay field may be shown in Table 1, and details are not described herein again.

Optionally, the third indication information in this embodiment of this application may be a value in an ACK/NACK resource field in the DCI, and the ACK/NACK resource field is used to indicate a subcarrier location of the ACK/NACK and the second delay.

Optionally, the second delay in this embodiment of this application is greater than or equal to 10 ins.

In a possible implementation, in this embodiment of this application, when a subcarrier bandwidth of the ACKs or NACKs corresponding to the TBs scheduled by the DCI is 3.75 kHz, and the second delay may be one delay in a set {10 ms, 18 ms}; the second delay is one delay in a set {10 ms, 20 ms}; or the second delay is one delay in a set {10 ms, 26 ms}.

For example, the second delay may be one delay in the set {10 ms, 18 ms}. The subcarrier location of the ACK/NACK and the second delay that are indicated by the ACK/NACK resource field may be shown in Table 5. $k_1-1$ in Table 5 indicates the second delay.

TABLE 5

| ACK/NACK resource field | Subcarrier location of ACK/NACK | $k_1$ |
|---|---|---|
| 0 | 38 | 11 |
| 1 | 39 | 11 |

TABLE 5-continued

| ACK/NACK resource field | Subcarrier location of ACK/NACK | $k_1$ |
|---|---|---|
| 2 | 40 | 11 |
| 3 | 41 | 11 |
| 4 | 42 | 11 |
| 5 | 43 | 11 |
| 6 | 44 | 11 |
| 7 | 45 | 11 |
| 8 | 38 | 19 |
| 9 | 39 | 19 |
| 10 | 40 | 19 |
| 11 | 41 | 19 |
| 12 | 42 | 19 |
| 13 | 43 | 19 |
| 14 | 44 | 19 |
| 15 | 45 | 19 |

Alternatively, for example, the second delay may be one delay in the set {10 ms, 20 ms}. The subcarrier location of the ACK/NACK and the second delay that are indicated by the ACK/NACK resource field may be shown in Table 6. $k_1-1$ in Table 6 indicates the second delay.

TABLE 6

| ACK/NACK resource field | Subcarrier location of ACK/NACK | $k_1$ |
|---|---|---|
| 0 | 38 | 11 |
| 1 | 39 | 11 |
| 2 | 40 | 11 |
| 3 | 41 | 11 |
| 4 | 42 | 11 |
| 5 | 43 | 11 |
| 6 | 44 | 11 |
| 7 | 45 | 11 |
| 8 | 38 | 21 |
| 9 | 39 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

Alternatively, for example, the second delay may be one delay in the set {10 ms, 26 ms}. The subcarrier location of the ACK/NACK and the second delay that are indicated by the ACK/NACK resource field may be shown in Table 7. $k_1-1$ in Table 7 indicates the second delay.

TABLE 7

| ACK/NACK resource field | Subcarrier location of ACK/NACK | $k_1$ |
|---|---|---|
| 0 | 38 | 11 |
| 1 | 39 | 11 |
| 2 | 40 | 11 |
| 3 | 41 | 11 |
| 4 | 42 | 11 |
| 5 | 43 | 11 |
| 6 | 44 | 11 |
| 7 | 45 | 11 |
| 8 | 38 | 27 |
| 9 | 39 | 27 |
| 10 | 40 | 27 |
| 11 | 41 | 27 |
| 12 | 42 | 27 |
| 13 | 43 | 27 |
| 14 | 44 | 27 |
| 15 | 45 | 27 |

In another possible implementation, in this embodiment of this application, a subcarrier bandwidth of the ACKs or NACKs corresponding to the TBs scheduled by the DCI is 15 kHz, and the second delay may be one delay in a set {10 ms, 12 ms, 14 ms, 15 ms}; the second delay may be one delay in a set {10 ms, 14 ms, 16 ms, 17 ms}; the second delay may be one delay in a set {10 ms, 12 ms, 14 ms, 16 ms}; or the second delay is one delay in a set {10 ms, 14 ms, 18 ms, 22 ms}.

For example, the second delay may be one delay in the set {10 ms, 12 ms, 14 ms, 15 ms}. The subcarrier location of the ACK/NACK and the second delay that are indicated by the ACK/NACK resource field may be shown in Table 8. $k_1-1$ in Table 8 indicates the second delay.

TABLE 8

| ACK/NACK resource field | Subcarrier location of ACK/NACK | $k_1$ |
| --- | --- | --- |
| 0 | 0 | 11 |
| 1 | 1 | 11 |
| 2 | 2 | 11 |
| 3 | 3 | 11 |
| 4 | 0 | 13 |
| 5 | 1 | 13 |
| 6 | 2 | 13 |
| 7 | 3 | 13 |
| 8 | 0 | 15 |
| 9 | 1 | 15 |
| 10 | 2 | 15 |
| 11 | 3 | 15 |
| 12 | 0 | 16 |
| 13 | 1 | 16 |
| 14 | 2 | 16 |
| 15 | 3 | 16 |

Alternatively, for example, the second delay may be one delay in the set {10 ms, 14 ms, 16 ms, 17 ms}. The subcarrier location of the ACK/NACK and the second delay that are indicated by the ACK/NACK resource field may be shown in Table 9. $k_1-1$ in Table 9 indicates the second delay.

TABLE 9

| ACK/NACK resource field | Subcarrier location of ACK/NACK | $k_1$ |
| --- | --- | --- |
| 0 | 0 | 11 |
| 1 | 1 | 11 |
| 2 | 2 | 11 |
| 3 | 3 | 11 |
| 4 | 0 | 15 |
| 5 | 1 | 15 |
| 6 | 2 | 15 |
| 7 | 3 | 15 |
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

Alternatively, for example, the second delay may be one delay in the set {10 ms, 12 ms, 14 ms, 16 ms}. The subcarrier location of the ACK/NACK and the second delay that are indicated by the ACK/NACK resource field may be shown in Table 10. $k_1-1$ in Table 10 indicates the second delay.

TABLE 10

| ACK/NACK resource field | Subcarrier location of ACK/NACK | $k_1$ |
| --- | --- | --- |
| 0 | 0 | 11 |
| 1 | 1 | 11 |
| 2 | 2 | 11 |
| 3 | 3 | 11 |
| 4 | 0 | 13 |
| 5 | 1 | 13 |
| 6 | 2 | 13 |
| 7 | 3 | 13 |
| 8 | 0 | 15 |
| 9 | 1 | 15 |
| 10 | 2 | 15 |
| 11 | 3 | 15 |
| 12 | 0 | 17 |
| 13 | 1 | 17 |
| 14 | 2 | 17 |
| 15 | 3 | 17 |

Alternatively, for example, the second delay may be one delay in the set {10 ms, 14 ms, 18 ms, 22 ms}. The subcarrier location of the ACK/NACK and the second delay that are indicated by the ACK/NACK resource field may be shown in Table 11. $k_1-1$ in Table 11 indicates the second delay.

TABLE 11

| ACK/NACK resource field | Subcarrier location of ACK/NACK | $k_1$ |
| --- | --- | --- |
| 0 | 0 | 11 |
| 1 | 1 | 11 |
| 2 | 2 | 11 |
| 3 | 3 | 11 |
| 4 | 0 | 15 |
| 5 | 1 | 15 |
| 6 | 2 | 15 |
| 7 | 3 | 15 |
| 8 | 0 | 19 |
| 9 | 1 | 19 |
| 10 | 2 | 19 |
| 11 | 3 | 19 |
| 12 | 0 | 23 |
| 13 | 1 | 23 |
| 14 | 2 | 23 |
| 15 | 3 | 23 |

$k_1-1$ in Table 5 to Table 11 indicates the second delay. It can be learned that, in this embodiment of this application, a minimum value of the second delay is 10 ms, that is, the second delay is greater than or equal to 10 ms.

Figure 8:
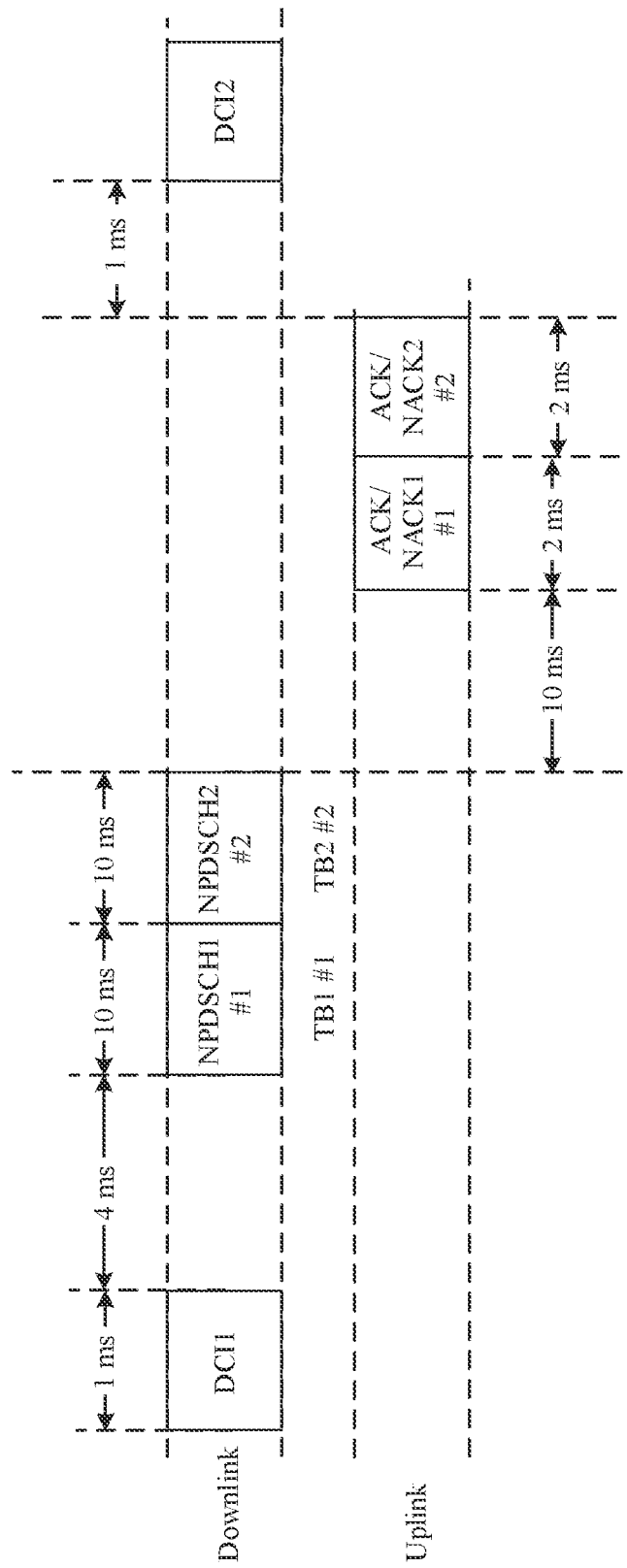
FIG. 8 is a schematic diagram 2 of downlink data scheduling according to an embodiment of this application.

In conclusion, based on the foregoing values of the first delay and the second delay, two HARQ processes are used as an example. It is assumed that the first delay may be a minimum value 4 ms, the second delay may be a minimum value 10 ms, duration of transmission of a NPDSCH carrying one TB is 10 ms, duration of transmission of an ACK or NACK corresponding to the TB is 2 ms, and duration of transmission of DCI1 is 1 ms. In this case, a scheduling pattern corresponding to a peak rate at which the DCI1 schedules two TBs may be shown in FIG. 8. In the figure, the DCI1 schedules two HARQ processes. DCI2 indicates DCI for next scheduling after the terminal device receives the DCI1, and the DCI2 may also schedule two HARQ processes. An interval between a start time of transmission of the DCI1 and a start time of transmission of the DCI2 is 40 ms.

Optionally, in still another possible implementation, the second delay in this embodiment of this application is greater than or equal to 11 ms.

In a possible implementation, in this embodiment of this application, when a subcarrier bandwidth of the ACKs or NACKs corresponding to the TBs scheduled by the DCI is 3.75 kHz, and the second delay may be one delay in a set {11 ms, 19 ms}; the second delay is one delay in a set {11 ms, 20 ms}; or the second delay is one delay in a set {11 ms, 27 ms}.

In another possible implementation, in this embodiment of this application, a subcarrier bandwidth of the ACKs or NACKs corresponding to the TBs scheduled by the DCI is 15 kHz, and the second delay may be one delay in a set {11 ms, 13 ms, 15 ms, 16 ms}; the second delay may be one delay in a set {11 ms, 14 ms, 16 ms, 17 ms}; the second delay may be one delay in a set {11 ms, 13 ms, 15 ms, 17 ms}; or the second delay is one delay in a set {11 ms, 15 ms, 19 ms, 23 ms}.

In this embodiment of this application, the second delay is greater than or equal to 11 ms, so that in all scheduling scenarios, including a scenario with repetition and a scenario without repetition, a delay between the end time of transmission of the downlink channel carrying TBs scheduled by the DCI and the ACK/NACK corresponding to the TBs is greater than or equal to 12 ms, to keep a same processing time with an existing terminal device. Consequently, compared with the existing terminal device, hardware costs and processing complexity of the terminal device that supports multi-TB scheduling are not greatly increased.

Optionally, in yet another possible implementation, the second delay in this embodiment of this application is related to at least one item in a first parameter set, and the first parameter set includes at least one of: a number of repetitions of the downlink channel carrying the TBs scheduled by the DCI, a number of downlink time units for mapping the downlink channel carrying the TBs scheduled by the DCI when the number of repetition is 1, or a number of downlink time units for mapping the downlink channel carrying the TBs scheduled by the DCI in one repetition unit, a number of repetitions of ACKs/NACKs corresponding to the TBs scheduled by the DCI, a number of uplink time units for mapping ACKs/NACKs corresponding to the TBs scheduled by the DCI when the number of repetition is 1, or a number of uplink time units for mapping ACKs/NACKs corresponding to the TBs scheduled by the DCI in one repetition unit, duration of one downlink time unit, duration of one uplink time unit, or a subcarrier bandwidth of the ACKs or NACKs corresponding to the TBs scheduled by the DCI. The downlink time unit may be a superframe, a frame, a subframe, a slot, a number of OFDM symbols, or a sampling point, and the uplink time unit may be a superframe, a frame, a subframe, a slot, a number of OFDM symbols, or a sampling point.

An NB-IoT system is used as an example. The first parameter set may include at least one of $N_{Rep}$, $N_{SF}$, $N_{Rep}^{AN}$, $N_{slots}^{UL}$, $T_{slot}$, and the subcarrier bandwidth of the ACKs or NACKs corresponding to the TBs scheduled by the DCI. $N_{Rep}$ is determined based on a repetition number field in the DCI, $N_{SF}$ is determined based on a resource assignment field in the DCI, $N_{Rep}^{AN}$ is a number of repetitions of an ACK or NACK corresponding to each TB, $N_{slots}^{UL}$ is a number of consecutive uplink slots corresponding to one resource unit, and $T_{slot}$ is duration of one uplink slot. For example, a value of $N_{slots}^{UL}$ may be 4 specified in a protocol. When the subcarrier bandwidth is 3.75 kHz, a value of $T_{slot}$ is $61440 \cdot T_s$; or when the subcarrier bandwidth is 15 kHz, a value of $T_{slot}$ is $15360 \cdot T_s$, where $T_s = 1/(15000 \times 2048)$ seconds.

For example, the first parameter set may include $N_{Rep}$, $N_{SF}$, $N_{Rep}^{AN}$, $N_{slots}^{UL}$, $T_{slot}$, and the subcarrier bandwidth of the ACKs or NACKs corresponding to the TBs scheduled by the DCI. Alternatively, the first parameter set includes $N_{Rep}$, $N_{SF}$, $N_{Rep}^{AN}$, $N_{slots}^{UL}$, and the subcarrier bandwidth of the ACKs or NACKs corresponding to the TBs scheduled by the DCI. Alternatively, the first parameter set may include $N_{Rep}$, $N_{SF}$, $N_{Rep}^{AN}$, and the subcarrier bandwidth of the ACKs or NACKs corresponding to the TBs scheduled by the DCI. Alternatively, the first parameter set may include $N_{Rep}$, $N_{SF}$, and the subcarrier bandwidth of the ACKs or NACKs corresponding to the TBs scheduled by the DCI. Alternatively, the first parameter set may include $N_{Rep}$, $N_{Rep}^{AN}$, and the subcarrier bandwidth of the ACKs or NACKs corresponding to the TBs scheduled by the DCI. Alternatively, the first parameter set may include $N_{Rep}$, $N_{SF}$, and $N_{Rep}^{AN}$.

In a specific example, the first parameter set includes at least $N_{Rep}$, $N_{SF}$, $N_{Rep}^{AN}$, and the subcarrier bandwidth of the ACKs or NACKs corresponding to the TBs scheduled by the DCI, and the second delay is related to $N_{Rep}$, $N_{SF}$, $N_{Rep}^{AN}$, and the subcarrier bandwidth of the ACKs or NACKs corresponding to the TBs scheduled by the DCI. For example, when the subcarrier bandwidth used to transmit the ACKs or NACKs corresponding to the M TBs is 3.75 kHz, if $N_{Rep} N_{SF}$ is greater than or equal to X1 and $N_{Rep}^{AN}$ is greater than or equal to Y1, the second delay is greater than or equal to Z1 ms; otherwise, the second delay is greater than or equal to W1 ms, where X1, Y1, Z1, and W1 are all positive integers, for example, X1=8 or 12, Y1=2 or 8, Z1=1, 2, or 4, and W1=10, 11, or 12. Alternatively, for example, when the subcarrier bandwidth used to transmit the ACKs or NACKs corresponding to the M TBs is 15 kHz, if $N_{Rep} N_{SF}$ is greater than or equal to X2 and $N_{Rep}^{AN}$ is greater than or equal to Y2, the second delay is greater than or equal to Z2 ms; otherwise, the second delay is greater than or equal to W2 ms, where X2, Y2, Z2, and W2 are all positive integers, for example, X2=8 or 12, Y2=2 or 8, Z2=1, 2, or 4, and W2=10, 11, or 12.

In another specific example, the first parameter set includes at least $N_{Rep}$, $N_{SF}$, and the subcarrier bandwidth of the ACKs or NACKs corresponding to the TBs scheduled by the DCI, and the second delay is related to $N_{Rep}$, $N_{SF}$, and the subcarrier bandwidth of the ACKs or NACKs corresponding to the TBs scheduled by the DCI. For example, when the subcarrier bandwidth used to transmit the ACKs or NACKs corresponding to the M TBs is 3.75 kHz, if $N_{Rep} N_{SF}$ is equal to X3, the second delay is greater than or equal to Z3 ms; otherwise, the second delay is greater than or equal to W3 ms, where X3, Z3, and W3 are all positive integers, for example, X3=1, Z3=11, and W3=10, or X3=1, Z3=12, and W3=10. Alternatively, for example, when the subcarrier bandwidth used to transmit the ACKs or NACKs corresponding to the M TBs is 15 kHz, if $N_{Rep} N_{SF}$ is equal to X4, the second delay is greater than or equal to Z4 ms; otherwise, the second delay is greater than or equal to W4 ms, where X4, Z4, and W4 are all positive integers, for example, X4=1, Z4=11, and W4=10, or X4=1, Z4=12, and W4=10.

In still another specific example, the first parameter set includes at least $N_{Rep}$, $N_{Rep}^{AN}$, and the subcarrier bandwidth of the ACKs or NACKs corresponding to the TBs scheduled by the DCI, and the second delay is related to $N_{Rep}$, $N_{Rep}^{AN}$, and the subcarrier bandwidth of the ACKs or NACKs corresponding to the TBs scheduled by the DCI. For example, when the subcarrier bandwidth used to transmit the ACKs or NACKs corresponding to the M TBs is 3.75 kHz, if $N_{Rep}$ is greater than or equal to X5 and $N_{Rep}^{AN}$ is greater than or equal to Y5, the second delay is greater than or equal to Z5 ms; otherwise, the second delay is greater than or equal to W5 ms, where X5, Y5, Z5, and W5 are all positive integers, for example, X5=16, Y5=2 or 8, Z5=1, 2, or 4, and W5=10, 11, or 12. Alternatively, for example, when the subcarrier bandwidth used to transmit the ACKs or NACKs corresponding to the M TBs is 15 kHz, if $N_{Rep}$ is equal to X6 and $N_{Rep}^{AN}$ is greater than or equal to Y6, the second delay is greater than or equal to Z6 ms; otherwise, the second delay is greater than or equal to W6 ms, where X6, Y6, Z6, and W6 are all positive integers, for example, X6=16, Y6=2 or 8, Z6=1, 2, or 4, and W6=10, 11, or 12.

In yet another specific example, the first parameter set includes at least $N_{Rep}$, $N_{SF}$, $N_{Rep}^{AN}$, $N_{slots}^{UL}$, $T_{slot}$, and the subcarrier bandwidth of the ACKs or NACKs corresponding to the TBs scheduled by the DCI, and the second delay is related to $N_{Rep}$, $N_{SF}$, $N_{Rep}^{AN}$, $N_{slots}^{UL}$, $T_{slot}$, and the subcarrier bandwidth of the ACKs or NACKs corresponding to the TBs scheduled by the DCI. For example, when the subcarrier bandwidth used to transmit the ACKs or NACKs corresponding to the M TBs is 3.75 kHz, the second delay may be one delay in a set {b ms, max{12−$N_{Rep}$ $N_{SF}$, 12-1000*$N_{Rep}^{AN}$ $N_{slots}^{UL}$ $T_{slot}$, X7} ms}. A sequence of elements in the set is not limited. b is a specified value, and b may be a positive integer, for example, b=11, 18, 19, 20, 26, or 27. X7 is a positive integer, for example, X7=1, 2, or 4. Alternatively, for example, when the subcarrier bandwidth used to transmit the ACKs or NACKs corresponding to the M TBs is 15 kHz, the second delay may be one delay in a set {c1 ms, c2 ms, c3 ms, max{12−$N_{Rep}$ $N_{SF}$, 12-1000* $N_{Rep}^{AN}$ $N_{slots}^{UL}$ $T_{slot}$, X8} ms}. A sequence of elements in the set is not limited. c1, c2, and c3 are specified values, and c1, c2, and c3 are positive integers. For example, c1=12, c2=14, and c3=15; c1=14, c2=16, and c3=17; c1=12, c2=14, and c3=16; c1=14, c2=18, and c3=22; c1=13, c2=15, and c3=16; c1=13, c2=15, and c3=17; or c1=15, c2=19, and c3=23. X8 is a positive integer, for example, X8=1, 2, or 4.

Optionally, in this embodiment of this application, in a specific example, when the subcarrier bandwidth used to transmit the ACKs or NACKs corresponding to the M TBs is 3.75 kHz, if both a first condition and a second condition are satisfied, the second delay is one delay in {Z11 ms, Z12 ms}; or if a first condition is not satisfied, a second condition is not satisfied, or neither a first condition nor a second condition is satisfied, the second delay is one delay in {W11 ms, W12 ms}. When the subcarrier bandwidth used to transmit the ACKs or NACKs corresponding to the M TBs is 15 kHz, if both a third condition and a fourth condition are satisfied, the second delay is one delay in {Z21 ms, Z22 ms, Z23 ms, Z24 ms}; or if a third condition is not satisfied, a fourth condition is not satisfied, or neither a third condition nor a fourth condition is satisfied, the second delay is one delay in {W21 ms, W22 ms, W23 ms, W24 ms}. The first condition is that transmission duration of a last TB in the M TBs scheduled by the DCI, $N_{Rep}$ $N_{SF}$, $N_{SF}$*min{$N_{Rep}$, 4}, min{$N_{Rep}$, 4}, or $N_{Rep}$ is greater than or equal to P1. The second condition is that transmission duration of an ACK/NACK corresponding to the first TB in the M TBs scheduled by the DCI, $N_{Rep}^{AN}$, 1000*$N_{Rep}^{AN}$ $N_{slots}^{UL}$ $T_{slot}$, $N_{Rep}^{AN}$, $N_{slots}^{UL}$ or $T_{slot}$, or $N_{Rep}^{AN}$, $N_{slots}^{UL}$ is greater than or equal to Q1. The third condition is that the transmission duration of the last TB in the M TBs scheduled by the DCI, $N_{Rep}$ $N_{SF}$, $N_{SF}$*min{$N_{Rep}$, 4}, min{$N_{Rep}$, 4}, or $N_{Rep}$ is greater than or equal to P2. The fourth condition is that the transmission duration of the ACK/NACK corresponding to the first TB in the M TBs scheduled by the DCI, $N_{Rep}^{AN}$, 1000*$N_{Rep}^{AN}$ $N_{slots}^{UL}$ $T_{slot}$, $N_{Rep}^{AN}$ $N_{slots}^{UL}$ $T_{slot}$, or $N_{Rep}^{AN}$ $N_{slots}^{UL}$ is greater than or equal to Q2. $N_{Rep}$ is determined based on the repetition number field in the DCI, $N_{SF}$ is determined based on the resource assignment field in the DCI, $N_{Rep}^{AN}$ is the number of repetitions of an ACK or NACK corresponding to each TB, $N_{slots}^{UL}$ is the number of consecutive uplink slots corresponding to one resource unit, and $T_{slot}$ is the duration of one uplink slot. For example, meanings of the foregoing symbols are as follows:

Both P1 and Q1 are specified values, and both P1 and Q1 are positive integers. For example, P1=1, 8, 12, or 16, and Q1=2, 8, or 12.

Both Z11 and Z12 are specified values, and both Z11 and Z12 are positive integers. For example, Z11=1, 2, 4, 10, or 11, and Z12 satisfies: Z12=Z11+8 or Z12=Z11+16. It should be noted that, that Z12 satisfies the foregoing formula should be understood that a value of Z12 satisfies the foregoing formula, and no calculation needs to be performed. Alternatively, Z12 is obtained through calculation by using the foregoing formula; or Z12 is implemented in another manner, and a final effect is the same as that of the foregoing formula.

Both W11 and W12 are specified values, and both W11 and W12 are positive integers. For example, W11=10, 11, or 12, and W12 satisfies: W12=W11+8 or W12=W11+16. It should be noted that, a value of W11 is greater than that of Z11. It should be noted that, that W12 satisfies the foregoing formula should be understood that a value of W12 satisfies the foregoing formula, and no calculation needs to be performed. Alternatively. W12 is obtained through calculation by using the foregoing formula; or W12 is implemented in another manner, and a final effect is the same as that of the foregoing formula.

Both P2 and Q2 are specified values, and both P2 and Q2 are positive integers. For example, P2=1, 8, 12, 16, and Q2=2, 8, or 12.

Z21, Z22, Z23, and Z24 are all specified values, and Z21, Z22, Z23, and Z24 are all positive integers. For example, Z21=1, 2, or 4; Z22 satisfies: Z22=Z21+2, Z22=Z21+4, Z22=Z21+5, Z22=Z21+6, Z22=Z21+8, or Z22=Z21+12; Z23 satisfies: Z23=Z21+2, Z23=Z21+4, Z23=Z21+5, Z23=Z21+6, Z23=Z21+8, or Z23=Z21+12; and Z24 satisfies: Z24=Z21+2, Z24=Z21+4, Z24=Z21+5, Z24=Z21+6, Z24=Z21+8, or Z24=Z21+12. It should be noted that Z24>Z23>Z22 is numerically satisfied. That Z22, Z23, and Z24 satisfy the foregoing formulas should be understood that values of Z22, Z23, and Z24 satisfy the foregoing formulas, and no calculation needs to be performed. Alternatively, Z22, Z23, and Z24 are obtained through calculation by using the foregoing formulas; or Z22, Z23, and Z24 are implemented in other manners, and final effects are the same as those of the foregoing formulas.

W21, W22, W23, and W24 are all specified values, and W21, W22, W23, and W24 are all positive integers. For example, W21=10, 11, or 12; W22 satisfies: W22=W21+2, W22=W21+4, W22=W21+5. W22=W21+6, W22=W21+8, or W22=W21+12; W23 satisfies: W23=W21+2, W23=W21+4, W23=W21+5, W23=W21+6, W23=W21+8, or W23=W21+12; and W24 satisfies: W24=W21+2, W24=W21+4, W24=W21+5, W24=W21+6, W24=W21+8, or W24=W21+12. It should be noted that W24>W23>W22 is numerically satisfied, and W21 is greater than Z21. That W22, W23, and W24 satisfy the foregoing formulas should be understood that values of W22, W23, and W24 satisfy the foregoing formulas, and no calculation needs to be performed. Alternatively, W22, W23, and W24 are obtained through calculation by using the foregoing formulas; or W22, W23, and W24 are implemented in other manners, and final effects are the same as those of the foregoing formulas.

Optionally, in this embodiment of this application, in a specific example, when the subcarrier spacing used to transmit the M corresponding ACKs or NACKs is 3.75 kHz, the second delay is one delay in $\{(X+A1) \text{ ms}, (X+A2) \text{ ms}\}$; or when the subcarrier spacing used to transmit the M corresponding ACKs or NACKs is 15 kHz, the second delay is one delay in $\{(X+B1) \text{ ms}, (X+B2) \text{ ms}, (X+B3) \text{ ms}, (X+B4) \text{ ms}\}$. X is between T1 and T2 and is a minimum value in a delay that is greater than or equal to Y ms and that is between an end time of transmission of a downlink channel carrying each of the M TBs scheduled by the DCI and an ACK/NACK corresponding to the TB. For example, meanings of the foregoing symbols are as follows:

A1 and A2 are specified values, A1 and A2 may be integers greater than or equal to 0, or A1 and A2 may be even numbers greater than or equal to 0. For example, A1=0 and A2=8; A1=0 and A2=9; A1=0 and A2=10; A1=0 and A2=11; or A1=0 and A2=16.

B1, B2, B3, and B4 are specified values, and B1, B2, B3, and B4 may be integers greater than or equal to 0. For example, B1=0, B2=2, B3=4, and B4=6; B1=0, B2=2, B3=4, B4=5; or B1=0, B2=4, B3=8, and B4=12.

T1 is a specified value, and T1 may be an integer greater than or equal to 0. For example, T1=0, 1, or 2.

T2 is a specified value, and T2 is a positive integer. For example, T2=11, 12, 13, or 14, or T2 is determined by using the third indication information in the DCI. It should be noted that, a value of T2 is greater than that of T1.

Y is a specified value, and Y is an integer greater than or equal to 0, for example, Y=12.

It should be noted that, in this embodiment, the expression "X is between T1 and T2 and is a minimum value in a delay that is greater than or equal to Y ms and that is between an end time of transmission of a downlink channel carrying each of the M TBs scheduled by the DCI and an ACK/NACK corresponding to the TB" may alternatively be expressed in a formula form. For example, X satisfies:
$X=\max\{Y-N_{Rep} N_{SF}, Y-1000*N_{Rep}^{AN} N_{slots}^{UL} T_{slot}, T1\}$,
$X=\max\{Y-\min\{N_{Rep}, 4\}, Y-1000*N_{Rep}^{AN} N_{slots}^{UL} T_{slot}, T1\}$, $X=\max\{Y-N_{SF}*\min\{N_{Rep},4\}, Y-1000*N_{Rep}^{AN} N_{slots}^{UL} T_{slot}, T1\}$, $X=\max\{Y-1000*N_{Rep}^{AN} N_{slots}^{UL} T_{slot}, T1\}$, $X=\max\{Y-N_{Rep} N_{SF}, Y-N_{Rep}^{AN} N_{slots}^{UL} T_{slot}, T1\}$, $X=\max\{Y-\min\{N_{Rep}, 4\}, Y-N_{Rep}^{AN} N_{slots}^{UL} T_{slot}, T1\}$, $X=\max\{Y-N_{SF}*\min\{N_{Rep}, 4\}, Y-N_{Rep}^{AN} N_{slots}^{UL} T_{slot}, T1\}$, or $X=\max\{Y-N_{Rep}^{AN} N_{slots}^{UL} T_{slot}, T1\}$. If X satisfies the foregoing formula, it should be understood that X is calculated by using the foregoing formula, or a value of X satisfies the foregoing formula and does not need to be calculated, or X is implemented in another manner, and a final effect is the same as that of the foregoing formula.

It should be noted that $N_{Rep} N_{SF}$ in the foregoing embodiment indicates a product of $N_{Rep}$ and $N_{SF}$, and is used to represent data transmission duration; $N_{Rep}^{AN} N_{slots}^{UL} T_{slot}$ in the foregoing embodiment indicates a product of $N_{Rep}^{AN}$, $N_{slots}^{UL}$, $T_{slot}$, and is used to represent ACK/NACK transmission duration; and "*" in the foregoing embodiment indicates a multiplication operation.

Based on the foregoing solution in this embodiment of this application, the network device may flexibly adjust a value of the second delay based on the first parameter set, thereby enhancing scheduling flexibility and improving transmission efficiency. In addition, it can be ensured that a relatively high rate is achieved in different coverage conditions, including a scenario with repetition and a scenario without repetition. Specifically, for example, the value of the second delay is flexibly adjusted based on the data transmission duration or the ACK/NACK transmission duration.

When the data transmission duration is relatively long, and the ACK/NACK transmission duration is also relatively long, a delay between an end time of transmission of a downlink channel carrying a TB scheduled by DCI and an ACK/NACK corresponding to the TB may be greater than or equal to 12 ms. In this case, a relatively small value of the second delay may be selected to ensure a relatively high rate in a scenario with repetition. In a scenario without repetition, the data transmission duration is relatively short, and the ACK/NACK transmission duration is also relatively short. In this case, a proper value of second delay may be selected. This ensures that a delay between an end time of transmission of a downlink channel carrying a TB scheduled by DCI and an ACK/NACK corresponding to the TB may be greater than or equal to 12 ms, and ensures that a relatively high rate is achieved in this scenario. Herein, a delay between the end time of transmission of the downlink channel carrying TBs scheduled by the DCI and the ACK/NACK corresponding to the TBs is greater than or equal to 12 ms, to ensure that the delay is consistent with a processing time of an existing terminal device. Consequently, compared with the existing terminal device, hardware costs and processing complexity of the terminal device that supports multi-TB scheduling are not greatly increased.

Alternatively, optionally, in this embodiment of this application, the second indication information may be used to determine a number $k_2$ of valid downlink subframes from a first subframe to a second subframe, where a subframe number of the first subframe is a sum of 5 and a subframe number of an end subframe for transmission of the DCI. The second subframe is a start subframe for transmission of the downlink channel corresponding to the M TBs.

Figure 9:
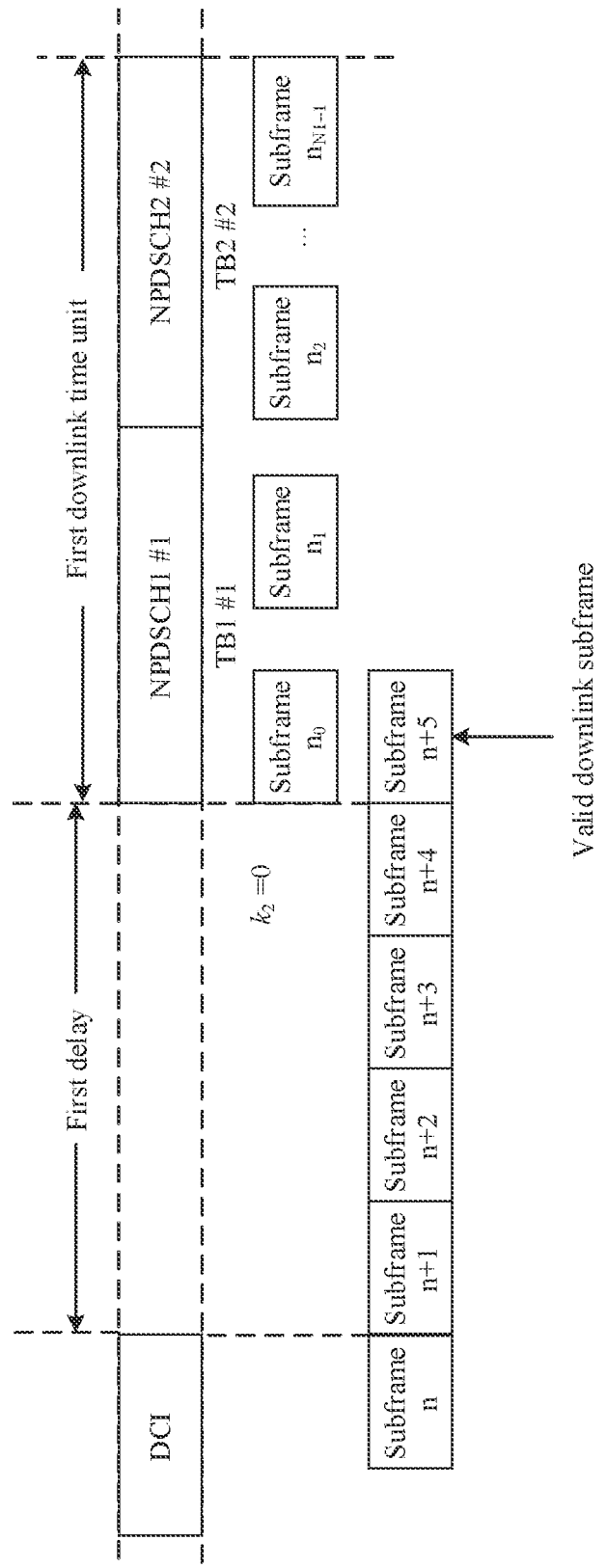
FIG. 9 is a schematic diagram 3 of downlink data scheduling according to an embodiment of this application.

For example, as shown in FIG. 9, two HARQ processes are used as an example. It is assumed that N=2, M=2, $k_2$=0, the end subframe for transmission of the DCI is a subframe n, the downlink channel carrying the M TBs is transmitted in the consecutive first downlink time units, the consecutive first downlink time units are N1 consecutive valid downlink subframes, and a subframe n+5 is a valid downlink subframe. In this case, the terminal device may determine the first delay based on the second indication information. The subframe n+5 is a start subframe (namely, a subframe $n_0$) of the first downlink time units. A subframe $n_0$, a subframe $n_1$, a subframe $n_2$, ..., and a subframe $n_{N1-1}$ in FIG. 9 are N1 consecutive valid downlink subframes. Certainly, if the subframe n+5 in FIG. 9 is not a valid downlink subframe, and a subframe n+6 is a valid downlink subframe, an end location of the first delay should be a start location of the subframe n+6, that is, the subframe $n_0$ is the subframe n+6. No illustration is provided herein.

Figure 10:
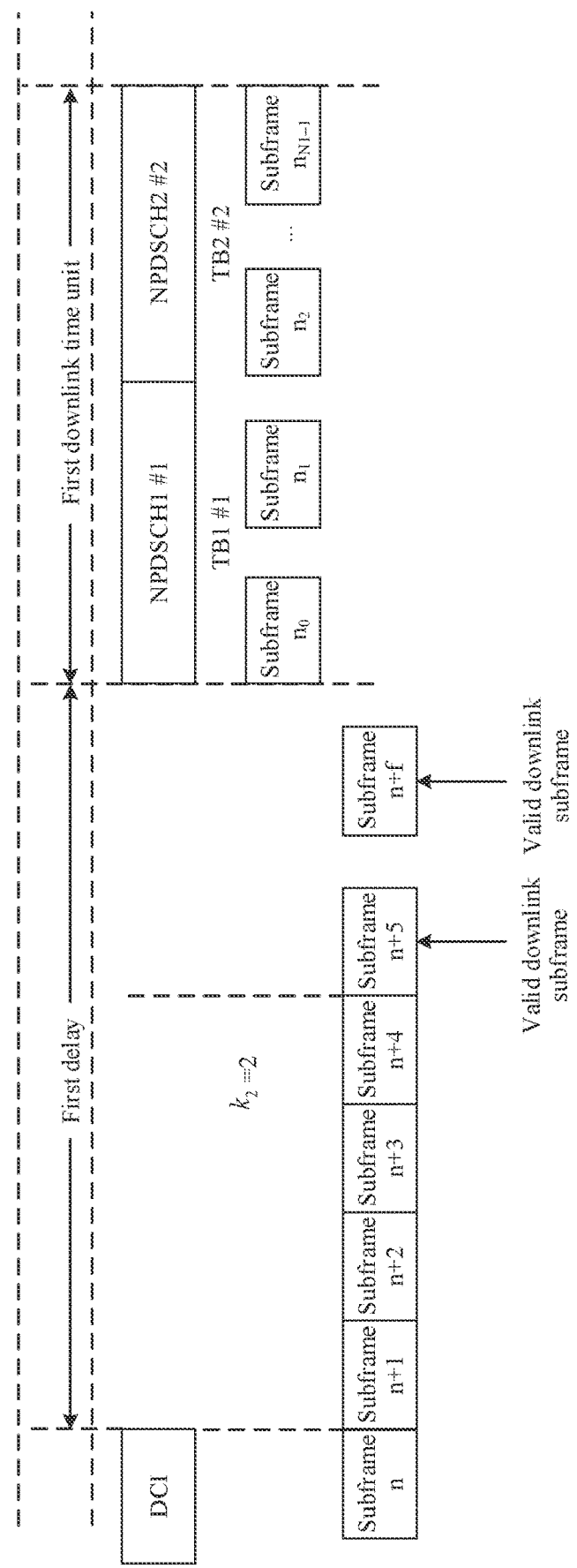
FIG. 10 is a schematic diagram 4 of downlink data scheduling according to an embodiment of this application.

Alternatively, two HARQ processes are used as an example. As shown in FIG. 10, it is assumed that N=2, M=2, $k_2$=2, the end subframe for transmission of the DCI is a subframe n, the downlink channel carrying the M TBs is transmitted in the consecutive first downlink time units, the consecutive first downlink time units are N1 consecutive valid downlink subframes, and a subframe n+5 and a subframe n+f are two consecutive valid downlink subframes. In this case, the terminal device may determine the first delay based on the second indication information. The first valid downlink subframe after the subframe n+f is a start subframe (namely, a subframe $n_0$) of the first downlink time units. A subframe $n_0$, a subframe $n_1$, a subframe $n_2$, ..., and a subframe $n_{N1-1}$ in FIG. 10 are N1 consecutive valid downlink subframes.

It should be noted that the NPDSCH #1 corresponding to the TB1 #1 and the NPDSCH #2 corresponding to the TB2

2 in FIG. 9 and FIG. 10 are merely examples. Actually occupied locations in time domain are the same as resource locations of the subframe $n_0$, the subframe $n_1$, the subframe $n_2, \ldots,$ and the subframe $n_{N1-1}$. General descriptions are provided herein.

Alternatively, optionally, in this embodiment of this application, the third indication information may determine a value $k_3$, where ($k_3-1$) is a number of subframes between the end time of the first downlink time units and the start time of the first uplink time units. The number of subframes may be a number of downlink subframes. In an NB-IoT system, downlink subframes (DL subframe) include a valid downlink subframe and also include an invalid downlink subframe.

Figure 11:
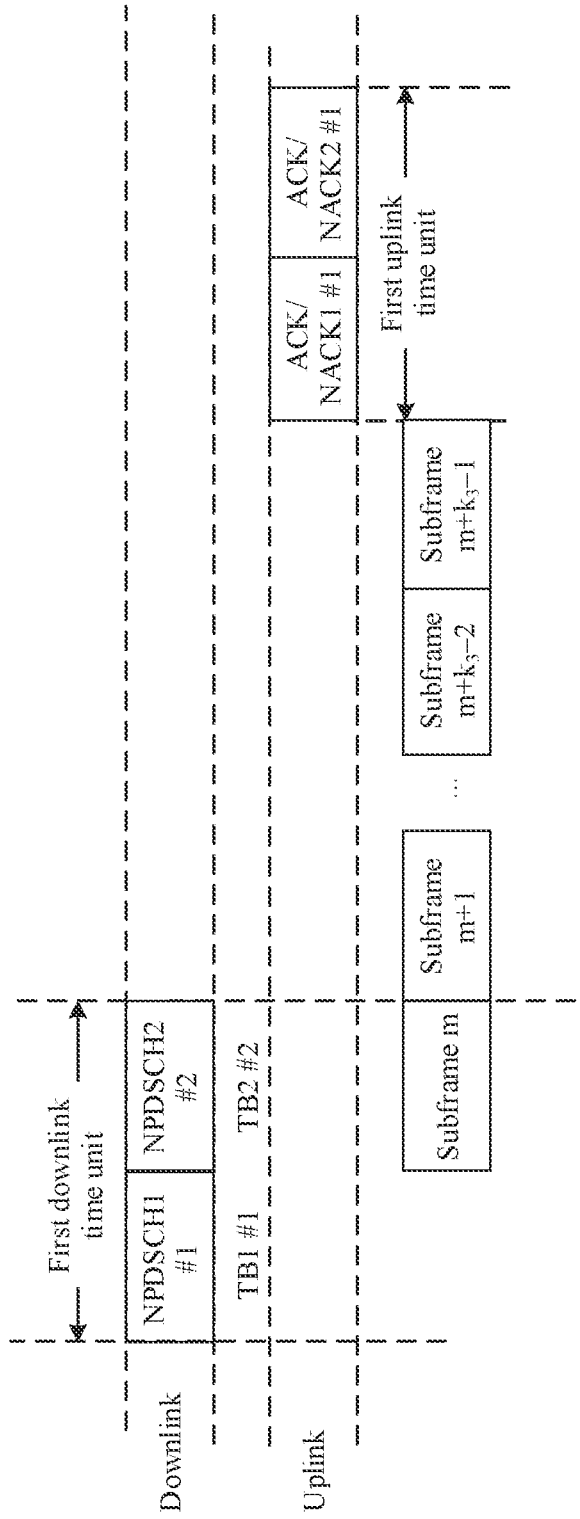
FIG. 11 is a schematic diagram 5 of downlink data scheduling according to an embodiment of this application.

For example, as shown in FIG. 11, it is assumed that N=2, M=2, the third indication information may be used to determine a value $k_3$, and an end subframe of the first downlink time units is a subframe m. In this case, the terminal device may determine the second delay based on the third indication information. A start subframe of the first uplink time units is a subframe $m+k_1$.

Optionally, in this embodiment of this application, assuming that N is greater than M, that is, N=M+S, and S is a positive integer, the data scheduling method provided in this embodiment of this application may further include the following steps S508 to S513.

S508: The network device determines that a downlink channel carrying S TBs is transmitted in consecutive second downlink time units, where the S TBs are last S TBs in the N TBs, and a start time of the second downlink time units is determined based on an end time of the first uplink time units and predefined duration.

S509: The terminal device determines that the downlink channel carrying the S TBs is transmitted in the consecutive second downlink time units. For related descriptions, refer to step S508. Details are not described herein again.

S510: The network device sends the downlink channel carrying the S TBs to the terminal device in the second downlink time units. The terminal device receives the downlink channel carrying the S TBs from the network device in the second downlink time units.

S511: The terminal device determines that ACKs or NACKs corresponding to the S TBs are transmitted in consecutive second uplink time units, where a start time of the second uplink time units is determined based on an end time of the second downlink time units and a third delay, where if S=1, the third delay is greater than or equal to the second delay; or if S is greater than 1, the third delay is equal to the second delay.

S512: The network device determines that the ACKs or NACKs corresponding to the S TBs are transmitted in the consecutive second uplink time units. For related descriptions, refer to step S511. Details are not described herein again.

S513: The terminal device sends the ACKs or NACKs corresponding to the S TBs to the network device in the second uplink time units. The network device receives the ACKs or NACKs corresponding to the S TBs from the terminal device in the second uplink time units.

Figure 12:
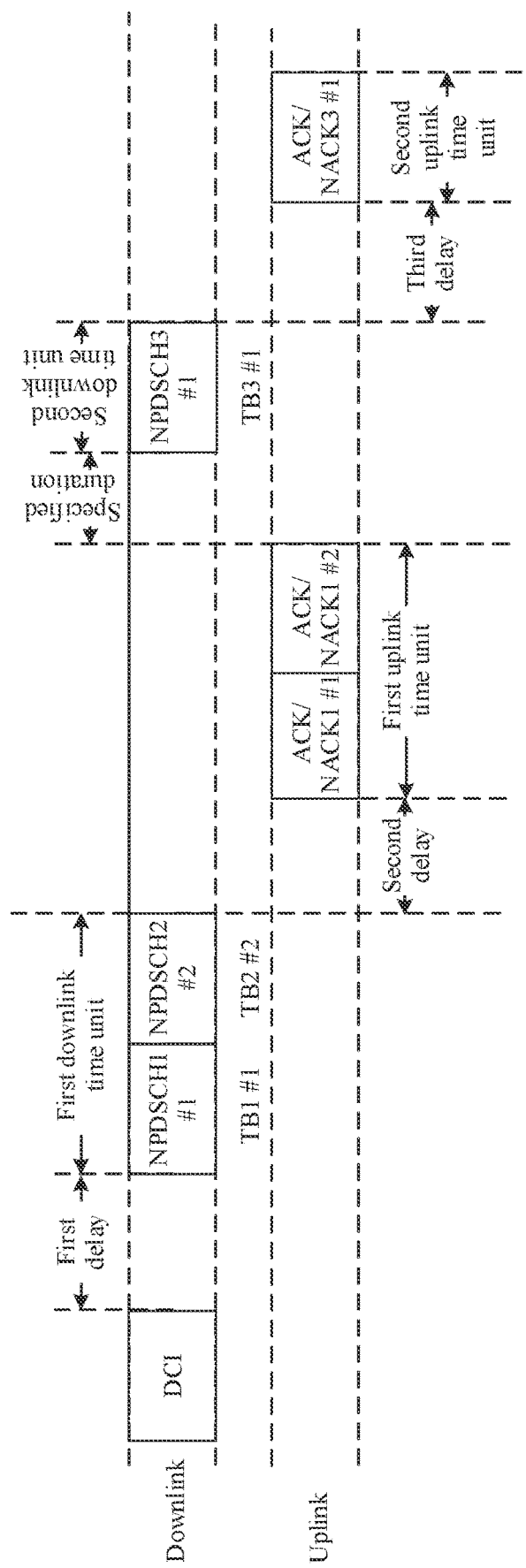
FIG. 12 is a schematic diagram 6 of downlink data scheduling according to an embodiment of this application.

In the foregoing steps S508 to S513:

Two HARQ processes are used as an example. It is assumed that N=3, M=2, and S=1. In this case, a schematic diagram of downlink scheduling through the DCI may be shown in FIG. 12. An NPDSCH1 #1 carrying a TB1 #1 and a NPDSCH2 #2 carrying a TB2 #2 are transmitted in consecutive first downlink time units, and a start time of the first downlink time units is determined based on an end time of transmission of the DCI and a first delay. An ACK/NACK1 #1 corresponding to the TB1 #1 and an ACK/NACK2 #2 corresponding to the TB2 #2 are transmitted in consecutive first uplink time units, and a start time of the first uplink time units is determined based on an end time of the first downlink time units and a second delay. An NPDSCH3 #1 carrying a TB3 #1 is transmitted in consecutive second downlink time units, and a start time of the second downlink time units is determined based on an end time of the first uplink time units and predefined duration. An ACK/NACK3 #1 corresponding to the TB3 #1 is transmitted in consecutive second uplink time units, where a start time of the second uplink time units is determined based on an end time of the second downlink time units and a third delay, and the third delay is greater than or equal to the second delay.

Optionally, the third delay is greater than or equal to the second delay. For example, the third delay may be max{a, second delay}, and a is a specified value. Considering that a minimum value of a HARQ delay in a conventional technology is 12 ms, for example, a herein may be 12 ms, to ensure that the terminal device has sufficient processing time for the NPDSCH3 #1 and downlink-to-uplink switching time.

Figure 13:
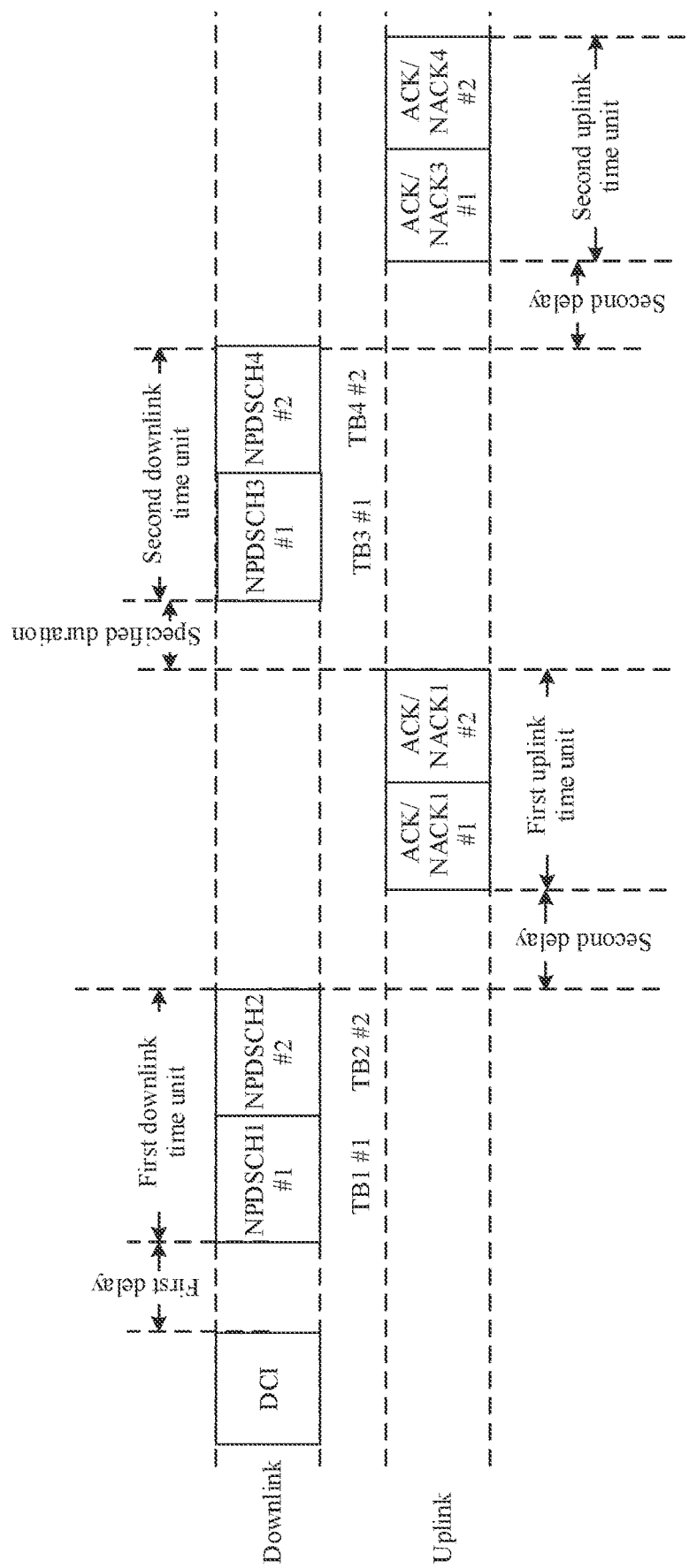
FIG. 13 is a schematic diagram 7 of downlink data scheduling according to an embodiment of this application.

Alternatively, for example, it is assumed that N=3, M=2, and S=2. In this case, a schematic diagram of downlink scheduling through the DCI may be shown in FIG. 13. An NPDSCH1 #1 carrying a TB1 #1 and a NPDSCH2 #2 carrying a TB2 #2 are transmitted in consecutive first downlink time units, and a start time of the first downlink time units is determined based on an end time of transmission of the DCI and a first delay. An ACK/NACK1 #1 corresponding to the TB1 #1 and an ACK/NACK2 #2 corresponding to the TB2 #2 are transmitted in consecutive first uplink time units, and a start time of the first uplink time units is determined based on an end time of the first downlink time units and a second delay. An NPDSCH3 #1 carrying a TB3 #1 and a NPDSCH4 #2 carrying a TB4 #2 are transmitted in consecutive second downlink time units, and a start time of the second downlink time units is determined based on an end time of the first uplink time units and predefined duration. An ACK/NACK3 #1 corresponding to the TB3 #1 and an ACK/NACK4 #2 corresponding to the TB4 #2 are transmitted in consecutive second uplink time units, and a start time of the second uplink time units is determined based on an end time of the second downlink time units and a second delay.

Optionally, in this embodiment of this application, if M is less than N, a value of M may be pre-agreed or specified in a protocol, or the value of M may be related to one of the following: a category of the terminal device; a coverage enhancement mode of the terminal device; or a number of HARQ processes used by the terminal device.

An NB-IoT system is used as an example. If the category of the terminal device is category NB1, M=1; or if the category of the terminal device is category NB2, M=2.

Alternatively, for example, when the number of HARQ processes used by the terminal device is 2, M=2, or when the number of HARQ processes used by the terminal device is 2. M=1.

For example, a scenario in which the number of HARQ processes used by the terminal device is 2 may be as follows: The terminal device reports, to the network device, a capability that the terminal device supports two HARQ processes, and the network device notifies, by using a configuration message, the terminal device to activate the two HARQ processes. In this case, the number of HARQ processes used by the terminal device is 2.

For example, a scenario in which the number of HARQ processes used by the terminal device is 1 may be as follows: The terminal device reports, to the network device, a capability that the terminal device supports two HARQ processes, and the network device does not notify, by using a configuration message, the terminal device to activate the two HARQ processes. In this case, the number of HARQ processes used by the terminal device is 1.

Alternatively, for example, a scenario in which the number of HARQ processes used by the terminal device is 1 may be as follows: The terminal device does not have a capability of supporting two HARQ processes. For example, the terminal device supports only one HARQ process. In this case, the number of HARQ processes used by the terminal device is 1.

Optionally, in this embodiment of this application, the consecutive second downlink time units are N3 consecutive valid downlink subframes, where N3 is determined based on S, $N_{Rep}$, and $N_{SF}$, $N_{Rep}$ is determined based on a repetition number field in the DCI, and $N_{SF}$ is determined based on a resource assignment field in the DCI. For related descriptions of the consecutive valid downlink subframes, refer to the formula (1). Details are not described herein again.

For example, N3, S, $N_{Rep}$, and $N_{SF}$ satisfy the following formula (3):

$$N3 = S N_{Rep} N_{SF} \quad \text{Formula (3)}$$

Optionally, in this embodiment of this application, the consecutive second uplink time units are N4 consecutive uplink slots, where N4 is determined based on S, $N_{Rep}^{AN}$, and $N_{slots}^{UL}$, $N_{Rep}^{AN}$ is a number of repetitions of an ACK or NACK corresponding to each TB, and $N_{slots}^{UL}$ is a number of consecutive uplink slots corresponding to one resource unit. For example, a value of $N_{slots}^{UL}$ may be 4 specified in a protocol.

For example, N4, S, $N_{Rep}^{AN}$, and $N_{slots}^{UL}$ satisfy the following formula (4):

$$N4 = S N_{Rep}^{AN} N_{slots}^{UL} \quad \text{Formula (4)}$$

Optionally, in this embodiment of this application, after receiving the ACKs corresponding to the M TBs, the network device may send the downlink channel carrying the S TBs to the terminal device. Alternatively, after receiving the ACKs/NACKs corresponding to the M TBs, the network device may send the downlink channel carrying the S TBs to the terminal device. Alternatively, before receiving the ACKs/NACKs corresponding to the M TBs, the network device may send the downlink channel carrying the S TBs to the terminal device. This is not specifically limited herein.

Optionally, the predefined duration in this embodiment of this application may start from the end time of the first uplink time units, or may start from a sum of the end time of the first uplink time units and m1 consecutive time units. In this case, when determining the start time of the second downlink time units, in addition to considering the end time of the first uplink time units and the predefined duration, the m1 consecutive time units further need to be considered, where m1 is a pre-specified value. The m1 consecutive time units may be m1 consecutive downlink subframes, the m1 consecutive time units may be m1 consecutive valid downlink subframes, the m1 consecutive time units may be m1 consecutive uplink slots, the m1 consecutive time units may be m1 consecutive uplink subframes, or the m1 consecutive time units may be m1 milliseconds. The predefined duration may be agreed on by the terminal device and the network device in advance, or specified in a protocol, or configured by the network device for the terminal device in advance. This is not specifically limited in this embodiment of this application.

Based on the data scheduling method provided in this embodiment of this application, when one piece of DCI schedules a plurality of TBs, in this embodiment of this application, the downlink channel carrying the M TBs is transmitted in the consecutive first downlink time units, and the start time of the first downlink time units is determined based on the end time of transmission of the DCI and the first delay. Therefore, resource allocation of the M TBs is not limited. In addition, in this embodiment of this application, the ACKs or NACKs corresponding to the M TBs are transmitted in the consecutive first uplink time units, and the start time of the first uplink time units is determined based on the end time of the first downlink time units and the second delay. Therefore, resource allocation of the ACKs or NACKs corresponding to the M TBs is not limited either. In conclusion, based on the data scheduling method provided in this embodiment of this application, resource allocation flexibility can be improved when one piece of DCI schedules a plurality of TBs.

The processor 301 in the network device 30 shown in FIG. 3 may invoke application program code stored in the memory 302, to instruct the network device to perform the actions of the network device in steps S501 to S513. The processor 401 in the terminal device 40 shown in FIG. 3 may invoke application program code stored in the memory 402, to instruct the terminal device to perform the actions of the terminal device in steps S501 to S513. This is not limited in this embodiment.

Figure 14:
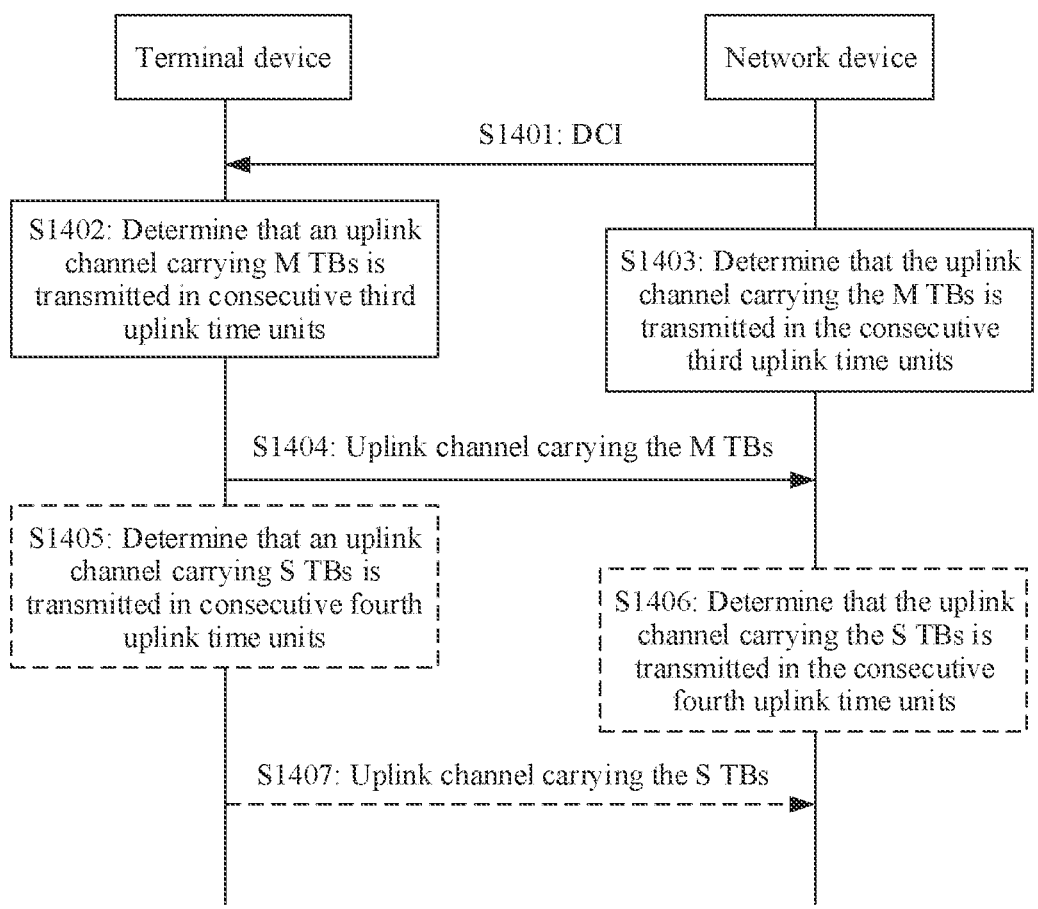
FIG. 14 is a schematic flowchart 2 of a data scheduling method according to an embodiment of this application.

FIG. 14 shows another data scheduling method according to an embodiment of this application. The data scheduling method includes the following steps S1401 to S1404.

S1401: A network device sends DCI to a terminal device. The terminal device receives the DCI from the network device. The DCI schedules N TBs.

Optionally, the DCI includes first indication information and second indication information, the first indication information is used to indicate a number N of TBs scheduled by the DCI, and the second indication information is used to determine a first delay, where N is a positive integer greater than 1.

S1402: The terminal device determines that an uplink channel carrying M TBs is transmitted in consecutive third uplink time units, where the M TBs are first M TBs in the N TBs scheduled by the DCI, a start time of the third uplink time units is determined based on an end time of transmission of the DCI and the first delay, and M is a positive integer greater than 1 and less than or equal to N.

It should be noted that in this embodiment of this application, steps S1401 and S1402 are not performed in a necessary sequence. Step S1401 may be performed before step S1402, step S1402 may be performed before step S1401, or steps S1401 and S1402 may be simultaneously performed. This is not specifically limited herein.

S1403: The network device determines that the uplink channel carrying the M TBs is transmitted in the consecutive third uplink time units. For related descriptions, refer to step S1402. Details are not described herein again.

It should be noted that in this embodiment of this application, steps S1401 and S1403 are not performed in a necessary sequence. Step S1401 may be performed before step S1403, step S1403 may be performed before step S1401, or steps S1401 and S1403 may be simultaneously performed. This is not specifically limited herein.

S1404: The terminal device sends the uplink channel carrying the M TBs to the network device in the third uplink time units. The network device receives the uplink channel carrying the M TBs from the terminal device in the third uplink time units.

Figure 15:
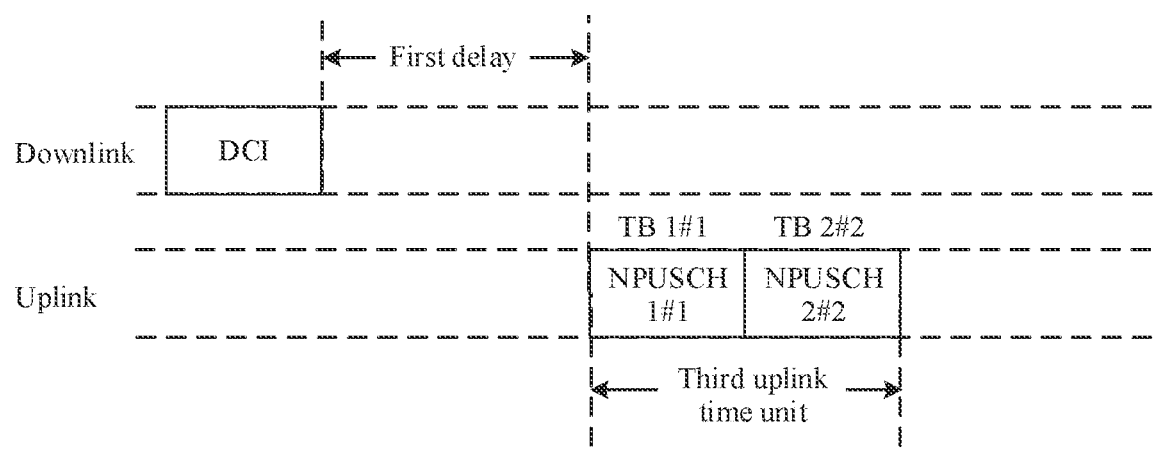
FIG. 15 is a schematic diagram 1 of uplink data scheduling according to an embodiment of this application.

In the foregoing steps S1401 and S1402:

For example, it is assumed that the uplink channel in this embodiment of this application may be a NPUSCH (where in the following examples, the uplink channel is a NPUSCH), N=2, and M=2 (namely, M=N). In this case, a schematic diagram of downlink scheduling through the DCI may be shown in FIG. 15.

An NPUSCH1 #1 carrying a TB1 #1 and a NPUSCH2 #2 carrying a TB2 #2 are transmitted in the consecutive third uplink time units, and the start time of the third uplink time units is determined based on the end time of transmission of the DCI and the first delay.

Optionally, in this embodiment of this application, if M=N, a value of M may be indicated by using first indication information.

Optionally, in this embodiment of this application, the consecutive third uplink time units are N5 consecutive uplink slots, where N5 is determined based on M, $N_{Rep}$, $N_{RU}$, and $N_{slots}^{UL}$, $N_{Rep}$ is determined based on a repetition number field in the DCI, $N_{RU}$ is determined based on a resource assignment field in the DCI, and $N_{slots}^{UL}$ indicates a number of uplink slots in one resource unit. NB-IoT is used as an example. The DCI includes a subcarrier assignment field, and a number $N_{sc}^{RU}$ of subcarriers in a resource unit may be determined. A subcarrier bandwidth may be obtained by using explicit signaling. Therefore, $N_{slots}^{UL}$ may be determined based on the subcarrier bandwidth, $N_{sc}^{RU}$, and Table 12. $N_{symb}^{UL}$ indicates a number of single-carrier frequency division multiple access (SC-FDMA) symbols in one uplink slot.

TABLE 12

| NPUSCH format | Subcarrier spacing | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

For example, N5, M, $N_{Rep}$, $N_{RU}$, and $N_{slots}^{UL}$ may satisfy the following formula (5):

$$N5 = M N_{Rep} N_{RU} N_{slots}^{UL} \quad \text{Formula (5)}$$

Optionally, the first indication information in this embodiment of this application may be explicit indication information. For example, the first indication information is a number N of TBs scheduled by the DCI.

Alternatively, optionally, the first indication information in this embodiment of this application may be implicit indication information. For example, the first indication information may be a k-bit bitmap. If a bit value in the k-bit bitmap is 1, it indicates one TB. In this case, bit values of N bits may be set to 1 in the k-bit bitmap to indicate the number N of TBs scheduled by the DCI. For example, an 8-bit bitmap 10011000 may indicate that the number N of TBs scheduled by the DCI is 3. Alternatively, if a bit value in the k-bit bitmap is 0, it indicates one TB. In this case, bit values of N bits in the k-bit bitmap may be set to 0 to indicate the number N of TBs scheduled by the DCI. For example, an 8-bit bitmap 10011100 may indicate that a number N of TBs scheduled by the DCI is 4.

After receiving the DCI from the network device, the terminal device may determine, based on the first indication information in the DCI, the number N of TBs scheduled by the DCI Optionally, in this embodiment of this application, assuming that N is greater than M, that is, N=M+S, and S is a positive integer, the data scheduling method provided in this embodiment of this application may further include the following steps S1405 to S1407.

S1405: The terminal device determines that an uplink channel carrying S TBs is transmitted in consecutive fourth uplink time units, where the S TBs are last S TBs in the N TBs scheduled by the DCI, and a start time of the fourth uplink time units is determined based on an end time of the third uplink time units and predefined duration.

S1406: The network device determines that the uplink channel carrying the S TBs is transmitted in the consecutive fourth uplink time units. For related descriptions, refer to step S1405. Details are not described herein again.

S1407: The terminal device sends the uplink channel carrying the S TBs to the network device in the fourth uplink time units. The network device receives the uplink channel carrying the S TBs from the terminal device in the fourth uplink time units.

Figure 16:
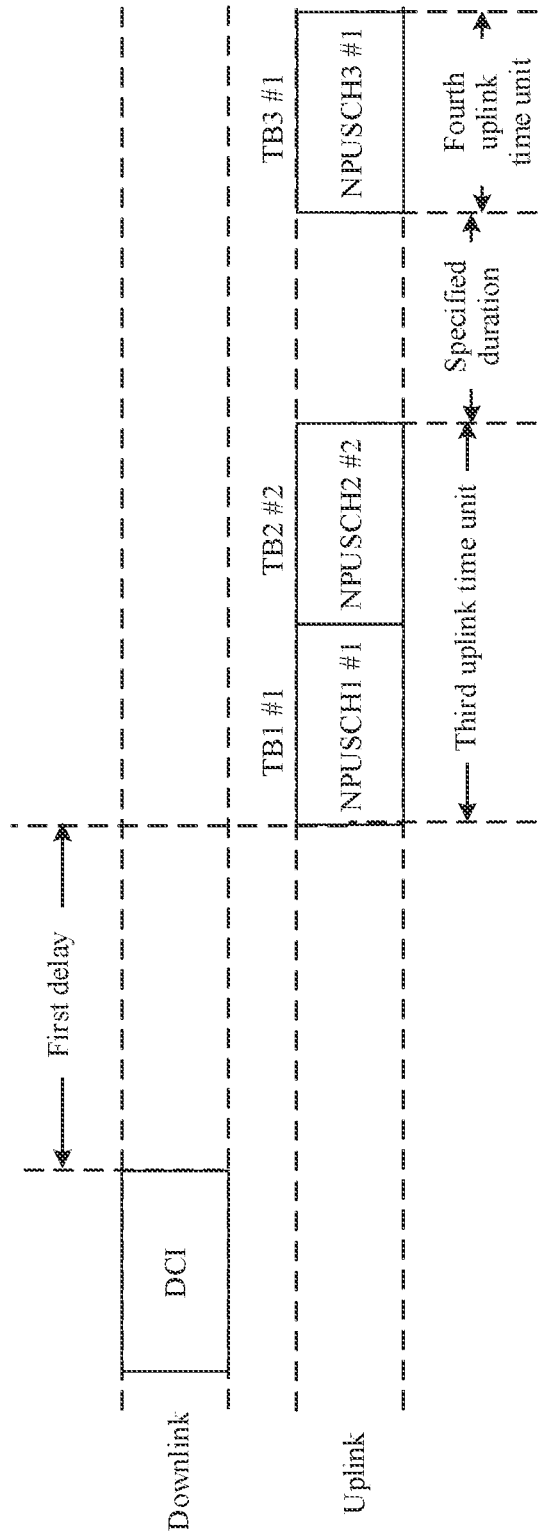
FIG. 16 is a schematic diagram 2 of uplink data scheduling according to an embodiment of this application.

In the foregoing steps S1405 to S1407:

For example, it is assumed that N=3, M=2, and S=1. In this case, a schematic diagram of downlink scheduling through the DCI may be shown in FIG. 16. An NPUSCH1 #1 carrying a TB1 #1 and a NPUSCH2 #2 carrying a TB2 #2 are transmitted in the consecutive third uplink time units, and the start time of the third uplink time units is determined based on the end time of transmission of the DCI and the first delay. An NPUSCH3 #1 corresponding to a TB3 #1 is transmitted in the consecutive fourth uplink time units, and the start time of the fourth uplink time units is determined based on the end time of the third uplink time units and the predefined duration.

Figure 17:
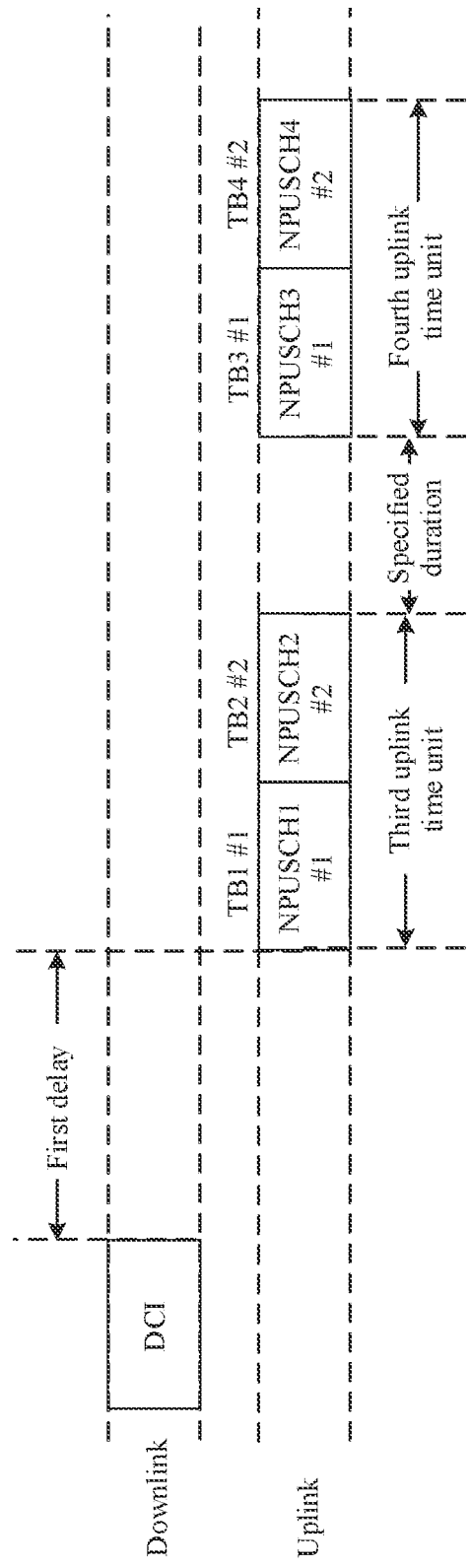
FIG. 17 is a schematic diagram 3 of uplink data scheduling according to an embodiment of this application.

Alternatively, for example, it is assumed that N=3, M=2, and S=2. In this case, a schematic diagram of downlink scheduling through the DCI may be shown in FIG. 17. An NPUSCH1 #1 carrying a TB1 #1 and a NPUSCH2 #2 carrying a TB2 #2 are transmitted in the consecutive third uplink time units, and the start time of the third uplink time units is determined based on the end time of transmission of the DCI and the first delay. An NPUSCH3 #1 carrying a TB3 #1 and a NPUSCH4 #2 carrying a TB4 #2 are transmitted in the consecutive fourth uplink time units, and the start time of the fourth uplink time units is determined based on the end time of the third uplink time units and the predefined duration.

Optionally, in this embodiment of this application, if M is less than N, for a manner of determining a value of M, refer to the embodiment shown in FIG. 5. Details are not described herein again.

Optionally, in this embodiment of this application, the fourth consecutive uplink time units are N6 consecutive uplink slots, where N6 is determined based on S, $N_{Rep}$, $N_{RU}$, and $N_{slots}^{UL}$. For related descriptions of $N_{Rep}$, $N_{RU}$, and $N_{slots}^{UL}$, refer to the foregoing formula (5). Details are not described herein again.

For example, N6, S, $N_{Rep}$, $N_{RU}$, and $N_{slots}^{UL}$ may satisfy the following formula (6):

$$N6 = S N_{Rep} N_{RU} N_{slots}^{UL} \quad \text{Formula (6)}$$

Optionally, the predefined duration in this embodiment of this application may start from the end time of the third uplink time units, or may start from a sum of the end time of the third uplink time units and m2 consecutive time units. In this case, when determining the start time of the fourth uplink time units, in addition to considering the end time of the third uplink time units and the predefined duration, the m2 consecutive time units further need to be considered, where m2 is a pre-specified value. The m2 consecutive time units may be m2 consecutive downlink subframes, the m2 consecutive time units may be m2 consecutive valid downlink subframes, the m2 consecutive time units may be m2 consecutive uplink slots, the m2 consecutive time units may be m2 consecutive uplink subframes, or the m2 consecutive time units may be m2 milliseconds. The predefined duration may be agreed on by the terminal device and the network device in advance, specified in a protocol, or configured by the network device for the terminal device in advance. This is not specifically limited in this embodiment of this application.

Based on the data scheduling method provided in this embodiment of this application, when one piece of DCI schedules a plurality of TBs, the uplink channel carrying the M TBs is transmitted in the consecutive third uplink time units, and the start time of the third uplink time units is determined based on the end time of transmission of the DCI and the first delay. Therefore, resource allocation of the M TBs is not limited, thereby improving resource allocation flexibility.

The processor 301 in the network device 30 shown in FIG. 3 may invoke application program code stored in the memory 302, to instruct the network device to perform the actions of the network device in steps S1401 to S1407. The processor 401 in the terminal device 40 shown in FIG. 3 may invoke application program code stored in the memory 402, to instruct the network device to perform the actions of the terminal device in steps S1401 to S1407. This is not limited in this embodiment.

It should be noted that discontinuous transmission in the embodiments shown in FIG. 5 and FIG. 14 is described by using an example in which two discontinuous transmissions are used. Certainly, the DCI in this embodiment of this application may also schedule more TBs, and the TBs may be discontinuously transmitted for more than two times. For the third discontinuous transmission and more than the third discontinuous transmission, refer to the foregoing second discontinuous transmission. A method is similar, and details are not described herein again.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It can be understood that, to implement the foregoing functions, the communication apparatus includes a corresponding hardware structure and/or software module for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 18:
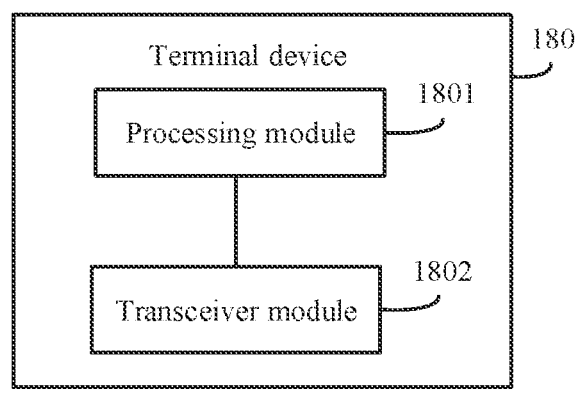
FIG. 18 is still another schematic structural diagram of a terminal device according to an embodiment of this application.

For example, the communication apparatus is the terminal device in the foregoing method embodiments. FIG. 18 is a schematic structural diagram of a terminal device 180. The terminal device 180 includes a processing module 1801 and a transceiver module 1802. The transceiver module 1802 may also be referred to as a transceiver unit, and is configured to implement a sending function and/or a receiving function. The transceiver module 1802 may be, for example, a transceiver circuit, a transceiver machine, a transceiver, or a communication interface.

For downlink scheduling:

The transceiver module 1802 is configured to receive DCI from a network device, where the DCI schedules N transport blocks TBs. The processing module 1801 is configured to determine that a downlink channel carrying M TBs is transmitted in consecutive first downlink time units, where the M TBs are first M TBs in the N TBs, a start time of the first downlink time units is determined based on an end time of transmission of the DCI and a first delay, N is a positive integer greater than 1, and M is a positive integer greater than 1 and less than or equal to N. The transceiver module 1802 is further configured to receive the downlink channel carrying the M TBs from the network device in the first downlink time units. The processing module 1801 is further configured to determine that ACKs or NACKs corresponding to the M TBs are transmitted in consecutive first uplink time units, where a start time of the first uplink time units is determined based on an end time of the first downlink time units and a second delay. The transceiver module 1802 is further configured to send the ACKs or NACKs corresponding to the M TBs to the network device in the first uplink time units.

Optionally, if N=M+S, and S is a positive integer, the processing module 1801 is further configured to determine that a downlink channel carrying S TBs is transmitted in consecutive second downlink time units, where the S TBs are last S TBs in the N TBs, and a start time of the second downlink time units is determined based on an end time of the first uplink time units and predefined duration. The transceiver module 1802 is further configured to receive the downlink channel carrying the S TBs from the network device in the second downlink time units. The processing module 1801 is further configured to determine that ACKs or NACKs corresponding to the S TBs are transmitted in consecutive second uplink time units, where a start time of the second uplink time units is determined based on an end time of the second downlink time units and a third delay, where if S=1, the third delay is greater than or equal to the second delay; or if S is greater than 1, the third delay is equal to the second delay. The transceiver module 1802 is further configured to send the ACKs or NACKs corresponding to the S TBs to the network device in the second uplink time units.

For uplink scheduling:

The transceiver module 1802 is configured to receive DCI from a network device, where the DCI includes first indication information and second indication information, the first indication information is used to indicate a number N of TBs scheduled by the DCI, and the second indication information is used to determine a first delay. The processing module 1801 is configured to determine that an uplink channel carrying M TBs is transmitted in consecutive third uplink time units, where the M TBs are first M TBs in the N TBs scheduled by the DCI, a start time of the third uplink time units is determined based on an end time of transmission of the DCI and the first delay, and M is a positive integer greater than 1 and less than or equal to N. The transceiver module 1802 is further configured to send the uplink channel carrying the M TBs to the network device in the third uplink time units.

Optionally, if N=M+S, and S is a positive integer, the processing module 1801 is further configured to determine that an uplink channel carrying S TBs is transmitted in consecutive fourth uplink time units, where the S TBs are last S TBs in the N TBs scheduled by the DCI, and a start time of the fourth uplink time units is determined based on an end time of the third uplink time units and predefined duration. The transceiver module 1802 is further configured to send the uplink channel carrying the S TBs to the network device in the fourth uplink time units.

All related content of the steps in the foregoing method embodiments may be cited in function descriptions of a corresponding functional module, and details are not described herein again.

In this embodiment, the terminal device 180 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device 180 may be in a form of the terminal device 40 shown in FIG. 3.

For example, the processor 401 in the terminal device 40 shown in FIG. 3 may invoke computer-executable instructions stored in the memory 402, to enable the terminal device 40 to perform the data scheduling method in the foregoing method embodiments.

Specifically, functions/implementation processes of the processing module 1801 and the transceiver module 1802 in FIG. 18 may be implemented by the processor 401 in the terminal device 40 shown in FIG. 3 by invoking the computer-executable instructions stored in the memory 402. Alternatively, the processor 401 in the terminal device 40 shown in FIG. 3 may invoke the computer-executable instructions stored in the memory 402, to implement functions/implementation processes of the processing module 1801 in FIG. 18, and the transceiver 403 in the terminal device 40 shown in FIG. 3 may implement functions/implementation processes of the transceiver module 1802 in FIG. 18.

Because the terminal device 180 provided in this embodiment may perform the foregoing data scheduling method, for a technical effect that can be achieved by the terminal device 180, refer to the foregoing method embodiments. Details are not described herein again.

Figure 19:
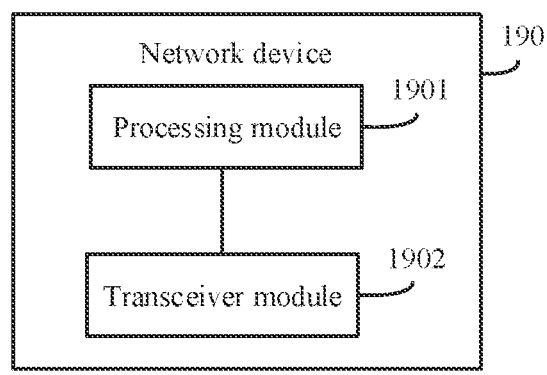
FIG. 19 is another schematic structural diagram of a network device according to an embodiment of this application.

Alternatively, for example, the communication apparatus is the network device in the foregoing method embodiments. FIG. 19 is a schematic structural diagram of a network device 190. The network device 190 includes a processing module 1901 and a transceiver module 1902. The transceiver module 1902 may also be referred to as a transceiver unit, and is configured to implement a sending function and/or a receiving function. The transceiver module 1902 may be, for example, a transceiver circuit, a transceiver machine, a transceiver, or a communication interface.

For downlink scheduling:

The transceiver module 1902 is configured to send DCI to a terminal device, where the DCI schedules N transport blocks TBs. The processing module 1901 is configured to determine that a downlink channel carrying M TBs is transmitted in consecutive first downlink time units, where the M TBs are first M TBs in the N TBs, a start time of the first downlink time units is determined based on an end time of transmission of the DCI and a first delay, N is a positive integer greater than 1, and M is a positive integer greater than 1 and less than or equal to N. The transceiver module 1902 is further configured to send the downlink channel carrying the M TBs to the terminal device in the first downlink time units. The processing module 1901 is further configured to determine that acknowledgements ACKs or negative acknowledgements NACKs corresponding to the M TBs are transmitted in consecutive first uplink time units, where a start time of the first uplink time units is determined based on an end time of the first downlink time units and a second delay. The transceiver module 1902 is further configured to receive the ACKs or NACKs corresponding to the M TBs from the terminal device in the first uplink time units.

Optionally, if N=M+S, and S is a positive integer, the processing module 1901 is further configured to determine that a downlink channel carrying S TBs is transmitted in consecutive second downlink time units, where the S TBs are last S TBs in the N TBs, and a start time of the second downlink time units is determined based on an end time of the first uplink time units and predefined duration. The transceiver module 1902 is further configured to send the downlink channel carrying the S TBs to the terminal device in the second downlink time units. The processing module 1901 is further configured to determine that ACKs or NACKs corresponding to the S TBs are transmitted in consecutive second uplink time units, where a start time of the second uplink time units is determined based on an end time of the second downlink time units and a third delay, where if S=1, the third delay is greater than or equal to the second delay; or if S is greater than 1, the third delay is equal to the second delay. The transceiver module 1902 is further configured to receive the ACKs or NACKs corresponding to the S TBs from the terminal device in the second uplink time units.

For uplink scheduling:

The transceiver module 1902 is configured to send DCI to a terminal device, where the DCI includes first indication information and second indication information, the first indication information is used to indicate a number N of TBs scheduled by the DCI, and the second indication information is used to determine a first delay. The processing module 1901 is configured to determine that an uplink channel carrying M TBs is transmitted in consecutive third uplink time units, where the M TBs are first M TBs in the N TBs scheduled by the DCI, a start time of the third uplink time units is determined based on an end time of transmission of the DCI and the first delay, and M is a positive integer greater than 1 and less than or equal to N. The transceiver module 1902 is configured to receive the uplink channel carrying the M TBs from the terminal device in the third uplink time units.

Optionally, if N=M+S, and S is a positive integer, the processing module 1901 is further configured to determine that an uplink channel carrying S TBs is transmitted in consecutive fourth uplink time units, where the S TBs are last S TBs in the N TBs scheduled by the DCI, and a start time of the fourth uplink time units is determined based on an end time of the third uplink time units and predefined duration. The transceiver module 1902 is further configured to receive the uplink channel carrying the S TBs from the terminal device in the fourth uplink time units.

All related content of the steps in the foregoing method embodiments may be cited in function descriptions of a corresponding functional module, and details are not described herein again.

In this embodiment, the network device 190 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network device 190 may be in a form of the network device 30 shown in FIG. 3.

For example, the processor 301 in the network device 30 shown in FIG. 3 may invoke computer-executable instructions stored in the memory 302, to enable the network device 30 to perform the data scheduling method in the foregoing method embodiments.

Specifically, functions/implementation processes of the processing module 1901 and the transceiver module 1902 in FIG. 19 may be implemented by the processor 301 in the network device 30 shown in FIG. 3 by invoking the computer-executable instructions stored in the memory 302. Alternatively, the processor 301 in the network device 30 shown in FIG. 3 may invoke the computer-executable instructions stored in the memory 302, to implement functions/implementation processes of the processing module 1901 in FIG. 19, and the transceiver 303 in the network device 30 shown in FIG. 3 may implement functions/implementation processes of the transceiver module 1902 in FIG. 19.

Because the network device 190 provided in this embodiment may perform the foregoing data scheduling method, for a technical effect that can be achieved by the terminal device 190, refer to the foregoing method embodiments. Details are not described herein again.

Optionally, an embodiment of this application further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to instruct the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the apparatuses described above.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A data scheduling method, comprising:
receiving, by a terminal device, downlink control information (DCI) from a network device, wherein the DCI schedules N transport blocks (TBs);
determining, by the terminal device, that a downlink channel carrying M TBs is transmitted in consecutive first downlink time units, wherein the M TBs are first M TBs in the N TBs, wherein a start time of the first downlink time units is determined based on an end time of transmission of the DCI and a first delay, wherein the first delay is determined based on the DCI, wherein N is a positive integer greater than 1, and wherein M is a positive integer greater than 1 and less than or equal to N;
receiving, by the terminal device, the downlink channel carrying the M TBs from the network device in the first downlink time units;
determining, by the terminal device, that acknowledgements (ACKs) or negative acknowledgements (NACKs) corresponding to the M TBs are transmitted in consecutive first uplink time units, wherein a start time of the first uplink time units is determined based on an end time of the first downlink time units and a second delay; and
sending, by the terminal device, the ACKs or NACKs corresponding to the M TBs to the network device in the first uplink time units.

2. The method according to claim 1, wherein the consecutive first downlink time units are N1 consecutive valid downlink subframes, wherein N1 is determined based on M, $N_{Rep}$, and $N_{SF}$, wherein $N_{Rep}$ is determined based on a repetition number field in the DCI, and wherein $N_{SF}$ is determined based on a resource assignment field in the DCI.

3. The method according to claim 2, wherein N1, M, $N_{Rep}$, and $N_{SF}$ satisfy:

$$N1=MN_{Rep}N_{SF}.$$

4. The method according to claim 1, wherein the consecutive first uplink time units are N2 consecutive uplink slots, wherein N2 is determined based on M, $N_{Rep}^{AN}$, and $N_{slots}^{UL}$, wherein $N_{Rep}^{AN}$ is a number of repetitions of an ACK or NACK corresponding to each TB, and wherein $N_{slots}^{UL}$ is a number of consecutive uplink slots corresponding to one resource unit.

5. The method according to claim 4, wherein N2, M, $N_{Rep}^{AN}$, and $N_{slots}^{UL}$ satisfy:

$$N2=MN_{Rep}^{AN}N_{slots}^{UL}.$$

6. A data scheduling method, comprising:
sending, by a network device, downlink control information (DCI) to a terminal device, wherein the DCI schedules N transport blocks (TBs);
determining, by the network device, that a downlink channel carrying M TBs is transmitted in consecutive first downlink time units, wherein the M TBs are first M TBs in the N TBs, wherein a start time of the first downlink time units is determined based on an end time of transmission of the DCI and a first delay, wherein the first delay is determined based on the DCI, wherein N is a positive integer greater than 1, and wherein M is a positive integer greater than 1 and less than or equal to N;
sending, by the network device, the downlink channel carrying the M TBs to the terminal device in the first downlink time units;
determining, by the network device, that acknowledgements (ACKs) or negative acknowledgements (NACKs) corresponding to the M TBs are transmitted in consecutive first uplink time units, wherein a start time of the first uplink time units is determined based on an end time of the first downlink time units and a second delay; and
receiving, by the network device, the ACKs or NACKs corresponding to the M TBs from the terminal device in the first uplink time units.

7. The method according to claim 6, wherein the consecutive first downlink time units are N1 consecutive valid downlink subframes, wherein N1 is determined based on M, $N_{Rep}$, and $N_{SF}$, wherein $N_{Rep}$ is determined based on a repetition number field in the DCI, and wherein $N_{SF}$ is determined based on a resource assignment field in the DCI.

8. The method according to claim 7, wherein N1, M, $N_{Rep}$, and $N_{SF}$ satisfy:

$$N1=MN_{Rep}N_{SF}.$$

9. The method according to claim 6, wherein the consecutive first uplink time units are N2 consecutive uplink slots, wherein N2 is determined based on M, $N_{Rep}^{AN}$, and $N_{slots}^{UL}$, wherein $N_{Rep}^{AN}$ is a number of repetitions of an ACK or NACK corresponding to each TB, and wherein $N_{slots}^{UL}$ is a number of consecutive uplink slots corresponding to one resource unit.

10. The method according to claim 9, wherein N2, M, $N_{Rep}^{AN}$, and $N_{slots}^{UL}$ satisfy:

$$N2=MN_{Rep}^{AN}N_{slots}^{UL}.$$

11. A communication apparatus, comprising:
at least one processor; and
one or more memories coupled to the at least one processor and storing programming instructions for execution by the at least one processor to:
receive downlink control information (DCI) from a network device, wherein the DCI schedules N transport blocks (TBs);
determine that a downlink channel carrying M TBs is transmitted in consecutive first downlink time units, wherein the M TBs are first M TBs in the N TBs, wherein a start time of the first downlink time units is determined based on an end time of transmission of the DCI and a first delay, wherein the first delay is determined based on the DCI, wherein N is a positive integer greater than 1, and wherein M is a positive integer greater than 1 and less than or equal to N;
receive the downlink channel carrying the M TBs from the network device in the first downlink time units;
determine that acknowledgements (ACKs) or negative acknowledgements (NACKs) corresponding to the M TBs are transmitted in consecutive first uplink time units, wherein a start time of the first uplink time units is determined based on an end time of the first downlink time units and a second delay; and
send the ACKs or NACKs corresponding to the M TBs to the network device in the first uplink time units.

12. The apparatus according to claim 11, wherein the consecutive first downlink time units are N1 consecutive valid downlink subframes, wherein N1 is determined based on M, $N_{Rep}$, and $N_{SF}$, wherein $N_{Rep}$ is determined based on a repetition number field in the DCI, and wherein $N_{SF}$ is determined based on a resource assignment field in the DCI.

13. The apparatus according to claim 12, wherein N1, M, $N_{Rep}$, and $N_{SF}$ satisfy:

$$N1=MN_{Rep}N_{SF}.$$

14. The apparatus according to claim 11, wherein the consecutive first uplink time units are N2 consecutive uplink slots, wherein N2 is determined based on M, $N_{Rep}^{AN}$, and $N_{slots}^{UL}$, wherein $N_{Rep}^{AN}$ is a number of repetitions of an ACK or NACK corresponding to each TB, and wherein $N_{slots}^{UL}$ is a number of consecutive uplink slots corresponding to one resource unit.

15. The apparatus according to claim 14, wherein N2, M, $N_{Rep}^{AN}$, and $N_{slots}^{UL}$ satisfy:

$$N5=MN_{Rep}^{AN}N_{slots}^{UL}.$$

16. A communication apparatus, comprising:
- a transceiver, wherein the transceiver is configured to send downlink control information (DCI) to a terminal device, and wherein the DCI schedules N transport blocks (TBs);
- at least one processor; and
- one or more memories coupled to the at least one processor and storing programming instructions for execution by the at least one processor to determine that a downlink channel carrying M TBs is transmitted in consecutive first downlink time units, wherein the M TBs are first M TBs in the N TBs, wherein a start time of the first downlink time units is determined based on an end time of transmission of the DCI and a first delay, wherein the first delay is determined based on the DCI, wherein N is a positive integer greater than 1, wherein M is a positive integer greater than 1 and less than or equal to N, and wherein:
- the transceiver is further configured to send the downlink channel carrying the M TBs to the terminal device in the first downlink time units;
- the programming instructions are for execution by the at least one processor to determine that acknowledgements (ACKs) or negative acknowledgements (NACKs) corresponding to the M TBs are transmitted in consecutive first uplink time units, wherein a start time of the first uplink time units is determined based on an end time of the first downlink time units and a second delay; and
- the transceiver is further configured to receive the ACKs or NACKs corresponding to the M TBs from the terminal device in the first uplink time units.

17. The apparatus according to claim 16, wherein the consecutive first downlink time units are N1 consecutive valid downlink subframes, wherein N1 is determined based on M, $N_{Rep}$, and $N_{SF}$, wherein $N_{Rep}$ is determined based on a repetition number field in the DCI, and wherein $N_{SF}$ is determined based on a resource assignment field in the DCI.

18. The apparatus according to claim 17, wherein N1, M, $N_{Rep}$, and $N_{SF}$ satisfy:

$$N1=MN_{Rep}N_{SF}.$$

19. The apparatus according to claim 16, wherein the consecutive first uplink time units are N2 consecutive uplink slots, wherein N2 is determined based on $N_{Rep}^{AN}$, and $N_{slots}^{UL}$, wherein $N_{Rep}^{AN}$ is a number of repetitions of an ACK or NACK corresponding to each TB, and wherein $N_{slots}^{UL}$ is a number of consecutive uplink slots corresponding to one resource unit.

20. The apparatus according to claim 19, wherein N2, M, $N_{Rep}^{AN}$, and $N_{slots}^{UL}$ satisfy:

$$N2=MN_{Rep}^{AN}N_{slots}^{UL}.$$

* * * * *

UNITED STATES PATENT AND TRADEMARK OFFICE
CERTIFICATE OF CORRECTION

| | | |
|---|---|---|
| PATENT NO. | : 11,991,713 B2 | Page 1 of 1 |
| APPLICATION NO. | : 17/388527 | |
| DATED | : May 21, 2024 | |
| INVENTOR(S) | : Zhihu Luo, Jun Li and Zhe Jin | |

It is certified that error appears in the above-identified patent and that said Letters Patent is hereby corrected as shown below:

On the Title Page

In Column 1 (item (30) Foreign Application Priority Data), In Line 1, Delete "(WO)" and insert -- (CN) --.

In Column 2 (item (30) Foreign Application Priority Data), In Line 1, Delete "(WO)" and insert -- (CN) --.

In the Claims

In Column 47, In Line 18, In Claim 15, delete "$N5=MN_{Rep}^{AN}Nslots^{UL}$." and insert -- $N2=MN_{Rep}^{AN}Nslots^{UL}$. --.

In Column 48, In Line 27, In Claim 19, after "on" insert -- M, --.

Signed and Sealed this
Twelfth Day of November, 2024

Katherine Kelly Vidal
*Director of the United States Patent and Trademark Office*